US010256973B2

United States Patent
Kumar et al.

(10) Patent No.: US 10,256,973 B2
(45) Date of Patent: Apr. 9, 2019

(54) LINEAR MASKING CIRCUITS FOR SIDE-CHANNEL IMMUNIZATION OF ADVANCED ENCRYPTION STANDARD HARDWARE

(71) Applicant: Intel Corporation, Santa Clara, CA (US)

(72) Inventors: Raghavan Kumar, Hillsboro, OR (US); Sanu K. Mathew, Hillsboro, OR (US); Avinash L. Varna, Chandler, AZ (US); Vikram B. Suresh, Hillsboro, OR (US); Sudhir K. Satpathy, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 151 days.

(21) Appl. No.: 15/283,000

(22) Filed: Sep. 30, 2016

(65) Prior Publication Data

US 2018/0097618 A1  Apr. 5, 2018

(51) Int. Cl.
*H04L 9/06* (2006.01)
*H03K 19/21* (2006.01)
(Continued)

(52) U.S. Cl.
CPC .............. *H04L 9/0662* (2013.01); *G09C 1/00* (2013.01); *H03K 19/215* (2013.01); *H04L 9/003* (2013.01);
(Continued)

(58) Field of Classification Search
CPC ... H04L 9/0662; H04L 9/0861; H04L 9/0631; H04L 9/003; H04L 2209/125;
(Continued)

(56) References Cited

U.S. PATENT DOCUMENTS 8,036,380 B2 * 10/2011 Gehrmann ............ H04L 9/3271
380/265
8,879,727 B2 * 11/2014 Taylor ................... H04L 9/0618
380/255
(Continued)

OTHER PUBLICATIONS

340mV-1.1V. 289Gbps/W, 2090-gate NanoAES Hardware Accelerator with Area-optimized Encrypt/Decrypt GF($2^4$)$^2$ Polynomials in 22nm tri-gate CMOS, Mathew, et al., 2014 Symposium on VLSI Circuits Digest of Technical Papers, from IEEE Xplore.*

(Continued)

*Primary Examiner* — Joseph P Hirl
*Assistant Examiner* — J. Brant Murphy
(74) *Attorney, Agent, or Firm* — Green, Howard, & Mughal LLP

(57) ABSTRACT

Described is an apparatus comprising an S-box circuitry operable to convert a value on an input into a value on an output in accordance with an Advanced Encryption Standard (AES) Rijndael S-box matrix. The apparatus also comprises a pseudo-random number generation (PRG) circuitry operable to provide a sequence of pseudo-random numbers on a first output and a registered copy of the sequence on a second output. The apparatus further comprises a mask circuitry operable to provide an XOR of a value on the output of the S box circuitry and a value on the first output of the PRG circuitry. The apparatus additionally comprises a mask removal circuitry operable to provide an XOR of a value on an output of the data register circuitry, a value coupled to an output of a key register circuitry, and a value on the second output of the PRG circuitry.

18 Claims, 12 Drawing Sheets

(51) Int. Cl.
*H04L 9/00* (2006.01)
*G09C 1/00* (2006.01)
*G11C 19/00* (2006.01)

(52) U.S. Cl.
CPC ............ *H04L 9/0631* (2013.01); *G11C 19/00* (2013.01); *H04L 2209/046* (2013.01); *H04L 2209/125* (2013.01)

(58) Field of Classification Search
CPC ................ H04L 2209/046; H03K 19/215; G11C 19/00; G09C 1/00
See application file for complete search history.

(56) References Cited

U.S. PATENT DOCUMENTS

| | | | | |
|---|---|---|---|---|
| 9,331,848 | B1* | 5/2016 | Pedersen | H04L 9/003 |
| 9,363,078 | B2* | 6/2016 | Taylor | H04L 9/0618 |
| 9,805,682 | B2* | 10/2017 | Wang | G02F 1/13 |
| 2002/0176578 | A1* | 11/2002 | LaPat | H04L 9/12 |
| | | | | 380/265 |
| 2003/0223580 | A1* | 12/2003 | Snell | H04L 9/003 |
| | | | | 380/28 |
| 2004/0025032 | A1* | 2/2004 | Chow | G06K 19/07363 |
| | | | | 713/189 |
| 2008/0143561 | A1* | 6/2008 | Miyato | H03M 5/04 |
| | | | | 341/79 |
| 2008/0144819 | A1* | 6/2008 | Gehrmann | H04L 9/3271 |
| | | | | 380/46 |
| 2008/0285745 | A1* | 11/2008 | Teglia | H04L 9/003 |
| | | | | 380/29 |
| 2009/0060197 | A1* | 3/2009 | Taylor | H04L 9/0618 |
| | | | | 380/277 |
| 2009/0172068 | A1* | 7/2009 | Kounavis | G06F 7/00 |
| | | | | 708/606 |
| 2011/0044450 | A1* | 2/2011 | Choi | H04L 9/003 |
| | | | | 380/28 |
| 2013/0028412 | A1* | 1/2013 | Coron | H04L 9/003 |
| | | | | 380/28 |
| 2013/0077790 | A1* | 3/2013 | Kawabata | H04L 9/003 |
| | | | | 380/277 |
| 2013/0129083 | A1* | 5/2013 | Fujino | G11C 7/24 |
| | | | | 380/29 |
| 2014/0016774 | A1* | 1/2014 | Wolrich | G06F 9/30018 |
| | | | | 380/28 |
| 2014/0040334 | A1* | 2/2014 | Burgess | G06F 1/0353 |
| | | | | 708/235 |
| 2014/0164785 | A1* | 6/2014 | Ochiai | H04L 9/002 |
| | | | | 713/189 |
| 2015/0023501 | A1* | 1/2015 | Taylor | H04L 9/0618 |
| | | | | 380/44 |
| 2016/0065361 | A1* | 3/2016 | Choi | H04L 9/002 |
| | | | | 380/287 |

OTHER PUBLICATIONS

International Search Report and Written Opinion from PCT/US2017/048754 notified Nov. 28, 2017, 10 pgs.

Mathew, S. et al., "340 mV-1.1 V, 289 Gbps/W, 2090-Gate NanoAES Hardware Accelerator With Area-Optimized Encrypt/Decrypt GF(24)2 Polynomials in 22 nm Tri-Gate CMOS", IEEE Journal of Solid-State Circuits, vol. 50, No. 4, Apr. 2015, pp. 1048-1058 (11 pages).

* cited by examiner

LINEAR MASKING CIRCUITS FOR SIDE-CHANNEL IMMUNIZATION OF ADVANCED ENCRYPTION STANDARD HARDWARE

BACKGROUND

The Advanced Encryption Standard (AES) is a specification for encryption of electronic data. AES, which employs secret keys, is used for encryption by the U.S. government and other entities worldwide. Security hardware running cryptographic algorithms, such as AES accelerators, are susceptible to side-channel attacks (SCAs). Such attacks may stimulate security hardware in order to extract leaked information, such as power signatures, current signatures, electromagnetic traces or waveforms, timing information, for example. The leakage information may then be used to develop an attack model to extract a secret key from the security hardware. SCAs accordingly pose significant threats to cryptographic systems.

Power SCAs are among the most prominent attack models for private-key encryption systems such as AES. Accordingly, AES accelerators and other hardware security accelerators may advantageously benefit from being made tolerant to or immune to SCAs by being designed to not leak information about embedded secrets (e.g., secret keys).

BRIEF DESCRIPTION OF THE DRAWINGS

The embodiments of the disclosure will be understood more fully from the detailed description given below and from the accompanying drawings of various embodiments of the disclosure. However, while the drawings are to aid in explanation and understanding, they are only an aid, and should not be taken to limit the disclosure to the specific embodiments depicted therein.

DETAILED DESCRIPTION

Figure 1:
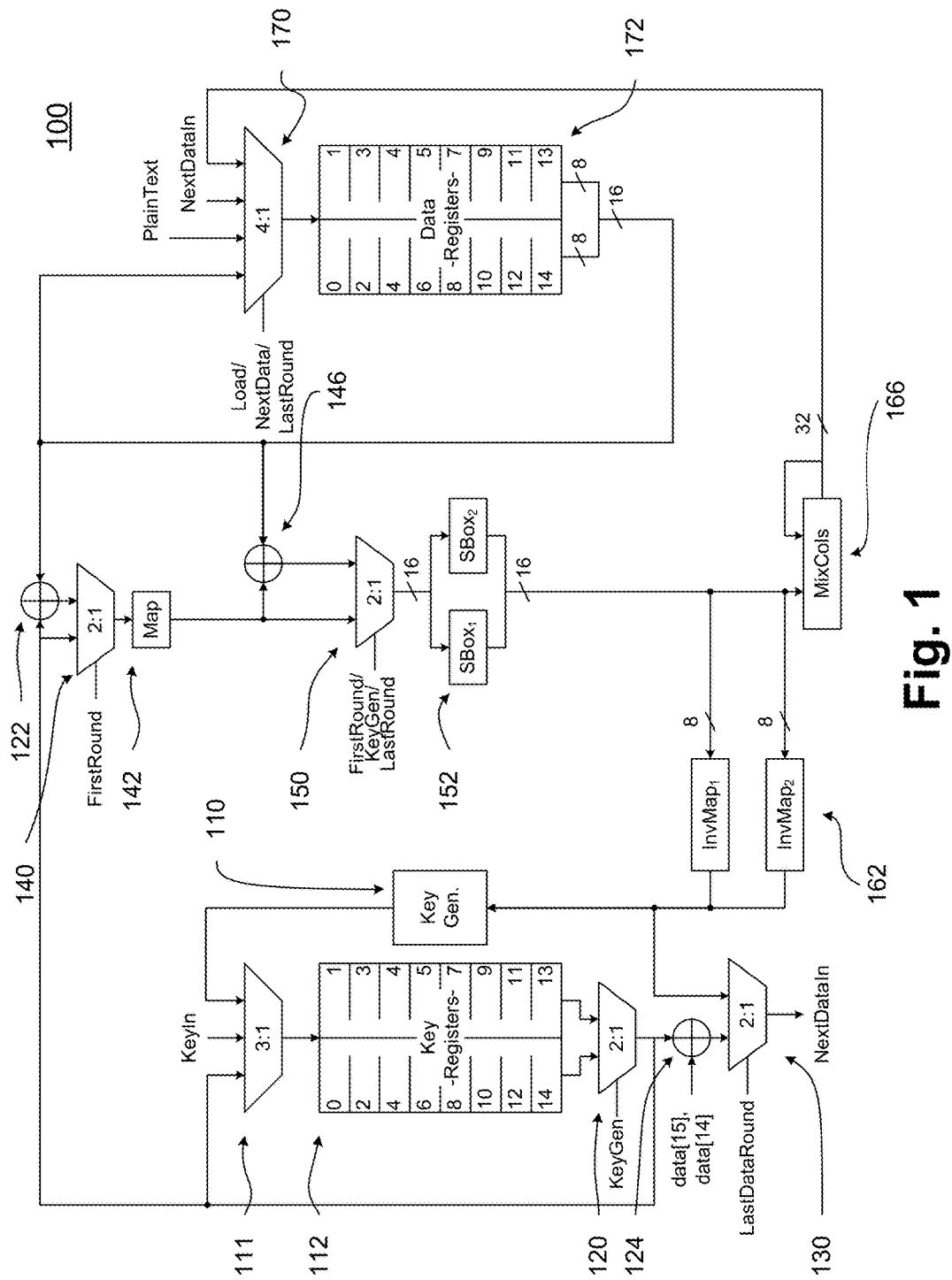
FIG. 1 illustrates a baseline AES accelerator with heterogeneous random-order processing S-boxes, in accordance with some embodiments of the disclosure.

AES accelerators and other security hardware running cryptographic algorithms may be susceptible to side-channel attacks (SCAs) to extract leaked information. Accordingly, AES accelerators and other hardware security accelerators may advantageously benefit from being made tolerant to or immune to SCAs by being designed to not leak information about embedded secrets (e.g., secret keys). The direct relationship between data and power signatures is a major reason behind side-channel vulnerabilities of AES designs.

Some existing techniques for protecting security hardware from power SCAs may include non-linear random masking, dual-rail logic design, and so on. However, such techniques may suffer from extremely large area overhead, energy consumption, or both, which may range from a factor of 2× to a factor of 4×, which may thereby render such techniques inefficient for practical hardware implementations.

A first type of design disclosed herein are extremely lightweight masking designs for disrupting dependencies between externally-visible data and measurable current signatures. The designs may mitigate a data/power relationship by adding data-independent random values with processed data such that power signatures may bear no relationship with processed data. Masking circuits according to the designs may provide random mask-inversion with less than three percent area overhead, at a factor of 4× improvement in area, in energy, or both over conventional designs. The proposed masking circuits may enable zero-throughput overheads when compared to a baseline AES accelerator designed without side-channel countermeasures, while conventional non-linear random masking technique may exhibit around a factor of 2× reduction in throughput.

Moreover, a Hamming Weight (HW) of an intermediate data within an AES design may leak information about the statistics of the bit distribution in a bus. A ratio of the number of 1's and 0's in an intermediate data bus may leak information about a secret key used for computing an intermediate state. From an extensive set of power traces, an HW distribution may be estimated and may then be used to construct a power model of the underlying computation from which the embedded secret may be extracted.

A second type of design disclosed herein are lightweight designs to enforce constant HW distributions across all input bytes. This may help ensure that a data/power relationship may be constant across all the possible values of input bytes, thereby thwarting the assembly of an HW model for extracting a secret key. The proposed designs may exhibit a minimal area overhead of one percent, at a factor of 2× improvement over conventional full dual-rail side-channel resistant designs.

In the following description, numerous details are discussed to provide a more thorough explanation of embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, mechanical, or magnetic connection between the things that are connected, without any intermediary devices. The term "coupled" means either a direct electrical, mechanical, or magnetic connection between the things that are connected or an indirect connection through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about" generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking, or in any other manner.

It is to be understood that the terms so used are interchangeable under appropriate circumstances such that the embodiments of the invention described herein are, for example, capable of operation in other orientations than those illustrated or otherwise described herein.

The terms "left," "right," "front," "back," "top," "bottom," "over," "under," and the like in the description and in the claims, if any, are used for descriptive purposes and not necessarily for describing permanent relative positions.

For purposes of the embodiments, the transistors in various circuits, modules, and logic blocks are Tunneling FETs (TFETs). Some transistors of various embodiments may comprise metal oxide semiconductor (MOS) transistors, which include drain, source, gate, and bulk terminals. The transistors may also include Tri-Gate and FinFET transistors, Gate All Around Cylindrical Transistors, Square Wire, or Rectangular Ribbon Transistors or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bipolar junction transistors-BJT PNP/NPN, BiCMOS, CMOS, etc., may be used for some transistors without departing from the scope of the disclosure.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

A first type of design disclosed herein may be employed for extremely lightweight masking designs for disrupting dependencies between externally-visible data and measurable current signatures. Attackers may collect power signatures from multiple random encryptions by changing plaintext values (e.g., input data) for a fixed key and observing corresponding ciphertext values. From the collected power values, an attacker may mount a power SCA such as a differential power analysis (DPA) or a correlation power attack (CPA).

As an example, a CPA may build a Hamming-Distance (HD) based data-power model to approximate a power consumption of a circuit under attack. In the model, a number of transitions between input and output bytes may be proportional to a power consumed during that computation. HDs may be correlated with observed power consumption profiles, and a correct key guess may yield a peak in a correlation-coefficient vector.

In the first type of design, in order to prevent an attacker from learning information about a mask in pre-determined mask designs, a mask value added with data may be generated randomly for every encryption round. Random mask values may be generated using a pseudo-random number generator. The mask may be added with data before a Mix Columns operation (as implemented by the hardware in accordance with AES requirements), then stored in data registers. The mask value may bear no relationship with the data being processed and hence the amount of leakage in the power signature may be significantly reduced.

The cipher text may then be extracted from the masked data using masking decompensation techniques. Based on the addition of the mask before the Mix Columns operation, a corresponding mask decompensation technique may be reduced to simple logic operations (such as XOR, NAND, NOR), thereby introducing very minimal area and energy overheads to the design.

FIG. 1 illustrates a baseline AES accelerator with heterogeneous random-order processing S-boxes, in accordance with some embodiments of the disclosure. An AES accelerator 100 may comprise a key generation circuitry 110, a pre-key-register multiplexing circuitry 111, a key register circuitry 112, a post-key-register multiplexing circuitry 120, a next-data XOR circuitry 124, and a next-data-in multiplexing circuitry 130. AES accelerator 100 may also comprise a first key-and-data XOR circuitry 122, a first key-and-data multiplexing circuitry 140, a map circuitry 142, a second key-and-data XOR circuitry 146, a second key-and-data multiplexing circuitry 150, an S-box circuitry 152, an inverse map circuitry 162, a mix columns circuitry 166, a pre-data-register multiplexing circuitry 170, and a data register circuitry 172.

Key generation circuitry 110 may have an input coupled to an output of inverse-map circuitry 162. Pre-key register multiplexing circuitry 111 may have at least an input coupled to a KeyIn signal path, an output of key generation circuitry 110, and an output of post-key-register multiplexing circuitry 120. Key register circuitry 112 may have an input coupled to an output of pre-key register multiplexing circuitry 111.

Post-key-register multiplexing circuitry 120 may have at least two inputs coupled to, respectively, a first output and a second output of key register circuitry 112, and a select input coupled to a KeyGen signal path. Next data XOR circuitry 124 may have an input coupled to two or more data bits and an input coupled to an output of post-key-register multiplexing circuitry 120. Next-data-in multiplexing circuitry 130 may have an input coupled to next data XOR circuitry 124, an input coupled to inverse map circuitry 162, a select input coupled to a LastDataRound signal path, and an output coupled to a NextDataIn signal path.

First key-and-data XOR circuitry 122 may have an input coupled to post-key-register multiplexing circuitry 120 and an input coupled to an output of data register circuitry 172. First key-and-data multiplexing circuitry 140 may have an input coupled to an output of post-key-register multiplexing circuitry 120 and an input coupled to the output of first key-and-data XOR circuitry 122. Map circuitry 142 may have an input coupled to an output of first key-and-data multiplexing circuitry 140. Second key-and-data XOR circuitry 146 may have an input coupled to an output of map circuitry 142 and an input coupled to an output of data register circuitry 172. Second key-and-data multiplexing circuitry 150 may have a first input coupled to an output of map circuitry 142, a second input coupled to an output of second key-and-data XOR circuitry 146, and a selection input coupled to one or more one of a FirstRound signal path, a KeyGen signal path, and a LastRound signal path.

S-box circuitry 152 may have an input coupled to an output of second key-and-data multiplexing circuitry 150. Inverse map circuitry 162 may have an input coupled to an output of S-box circuitry 152. Mix columns circuitry 166 may have an input coupled to an output of S-box circuitry 152, and may also have an input coupled to an output of mix columns circuitry 166 itself. Pre-data-register multiplexing circuitry 170 may have an input coupled to an output of data register circuitry 172, an input coupled to a PlainText input signal path, an input coupled to the NextDataIn signal path, and an input coupled to an output of mix columns circuitry 166. Pre-data-register multiplexing circuitry 170 may also have a select input coupled to one or more of a Load signal path, a NextData signal path, and the LastRound signal path. Data register circuitry 172 may have an input coupled to an output of pre-data-register multiplexing circuitry 170.

Values carried on the PlainText input signal path may undergo ten rounds of AES encryption. Keys for every round may be generated by key generation circuitry 110, which may share logic blocks used for encryption operations. The key generation process may be sandwiched between two encryption operations. An encryption round may include four operations: a Round Key addition, an S-box computation, a Shift Rows transformation, and a Mix Columns transformation.

During Round Key addition, key bytes may be added with incoming data bytes. The resulting bytes may be fed into S-box circuitry 152, which may implement a non-linear substitution of an incoming data byte. An S-box may take a certain number of input data bits and transforms them into a certain number of output bits, per the equation $Y=AX^{-1}+MB$, where X may be an input data byte, A may be an affine matrix, and MB may be an affine constant. During the Shift Rows operations, input data bytes may be permuted such that output data bytes may be in a different byte order.

AES accelerator 100 may include two S-boxes. In various designs, AES accelerator 100 may be scalable to include other numbers of S-boxes, such as four S-boxes, eight S-boxes, or sixteen S-boxes.

AES accelerator 100 may accordingly be based on a two S-box design. Instead of employing homogeneous S-boxes, S-box circuitry 152 may incorporate heterogeneous S-boxes designed using composite-field arithmetic GF $(2^4)^2$. Composite-field arithmetic may be governed by the choice of extension-field polynomial and ground-field polynomials. The two S-boxes may be designed using different composite-field arithmetic such that they exhibit contrasting power signatures.

The data flow through the S-boxes may be randomized every cycle during an encryption round such that the same data byte may exhibit different power signature during multiple rounds of encryption. A random data flow order may be determined by a pseudo-random number generator (PRG). In some embodiments, the pseudo-random number generator may include a linear-feedback shift register (LFSR).

The baseline design may incorporate appropriate cross-field mapping blocks between composite-fields 1 and 2 in which S-boxes are designed to ensure correct functionality. The baseline design may harden an SCA tolerance beginning from the input of the S-boxes. However, the inputs feeding the S-boxes may be similar between the baseline design and a conventional AES design implemented without any countermeasures. The input data bytes feeding the S-boxes may be generated by adding data bytes fetched from data register circuitry 172 with key bytes fetched from key register circuitry 112. As the circuitry generating input bytes for the baseline design and a conventional AES design are similar, the combinatorial logic may leak information about the key byte being added with the data byte. An extensive set of power traces along with a Hamming weight power model may leak some or all of the bits in the key.

Figure 2:
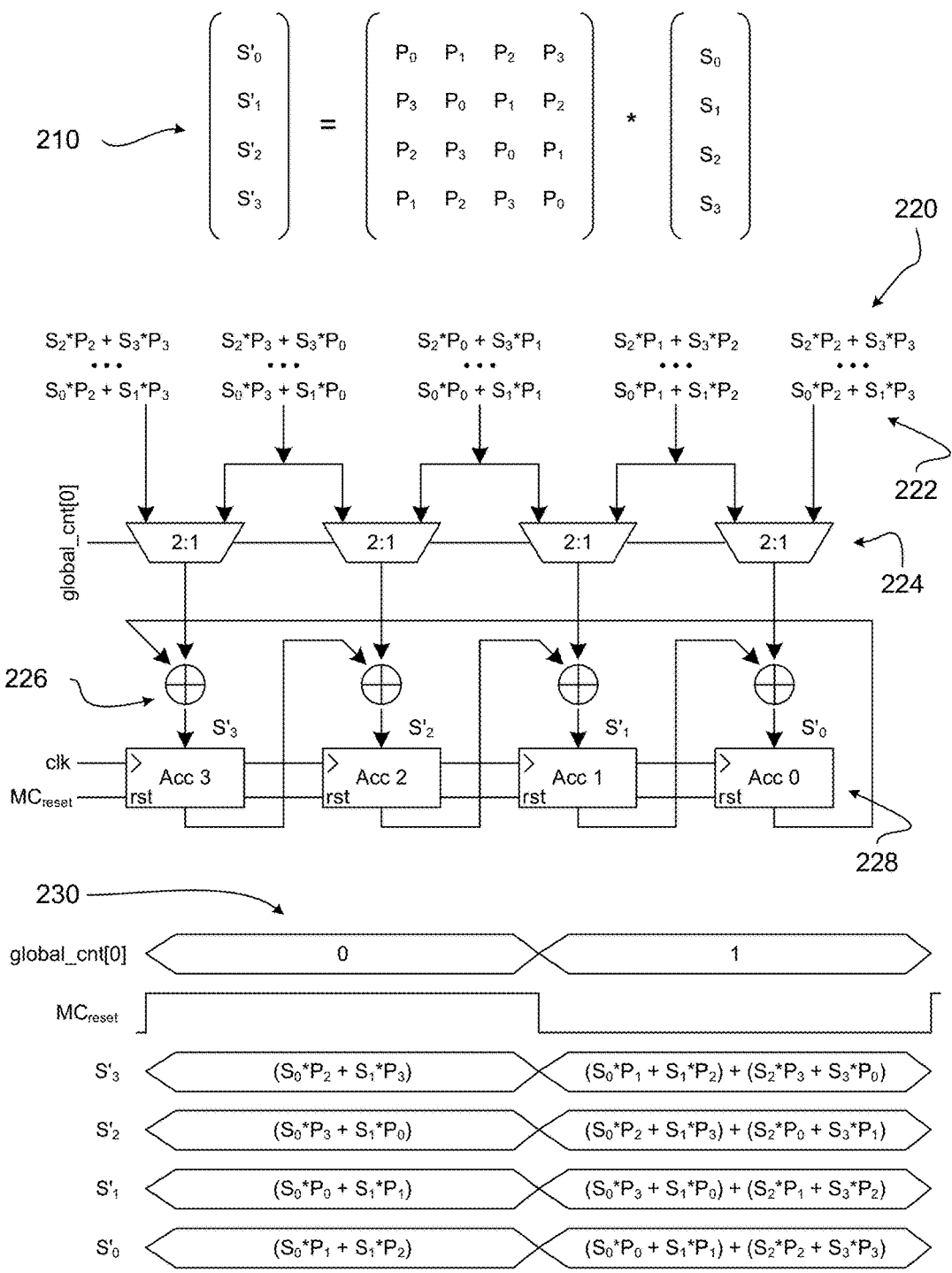
FIG. 2 illustrates a mix-columns block implementation, in accordance with some embodiments of the disclosure.

FIG. 2 illustrates a mix-columns block implementation, in accordance with some embodiments of the disclosure. A Mix Columns transformation may be implemented as a matrix multiplication 210, where incoming bytes of data may be multiplied with pre-determined scaling factors ($P_0$, $P_1$, $P_2$, and $P_3$), and may be added together to get an output data byte.

Mix columns block 220, which may be substantially similar to mix columns circuitry 166, may be implemented as a multiplier and accumulator (MAC) unit, where two bytes of data are multiplied with scaling factors and stored in registers. During the next cycle, the other two bytes of data are multiplied with scaling factors and added with the data stored in the registers. To this end, mix columns block 220 may comprise a multiplexing stage 224 accepting an input stream of partial terms 222, an XOR stage 226, and an accumulation stage 228.

Based upon various inputs at accumulation stage 228, mix columns block may iteratively calculate various terms of matrix multiplication 210.

Figure 3:
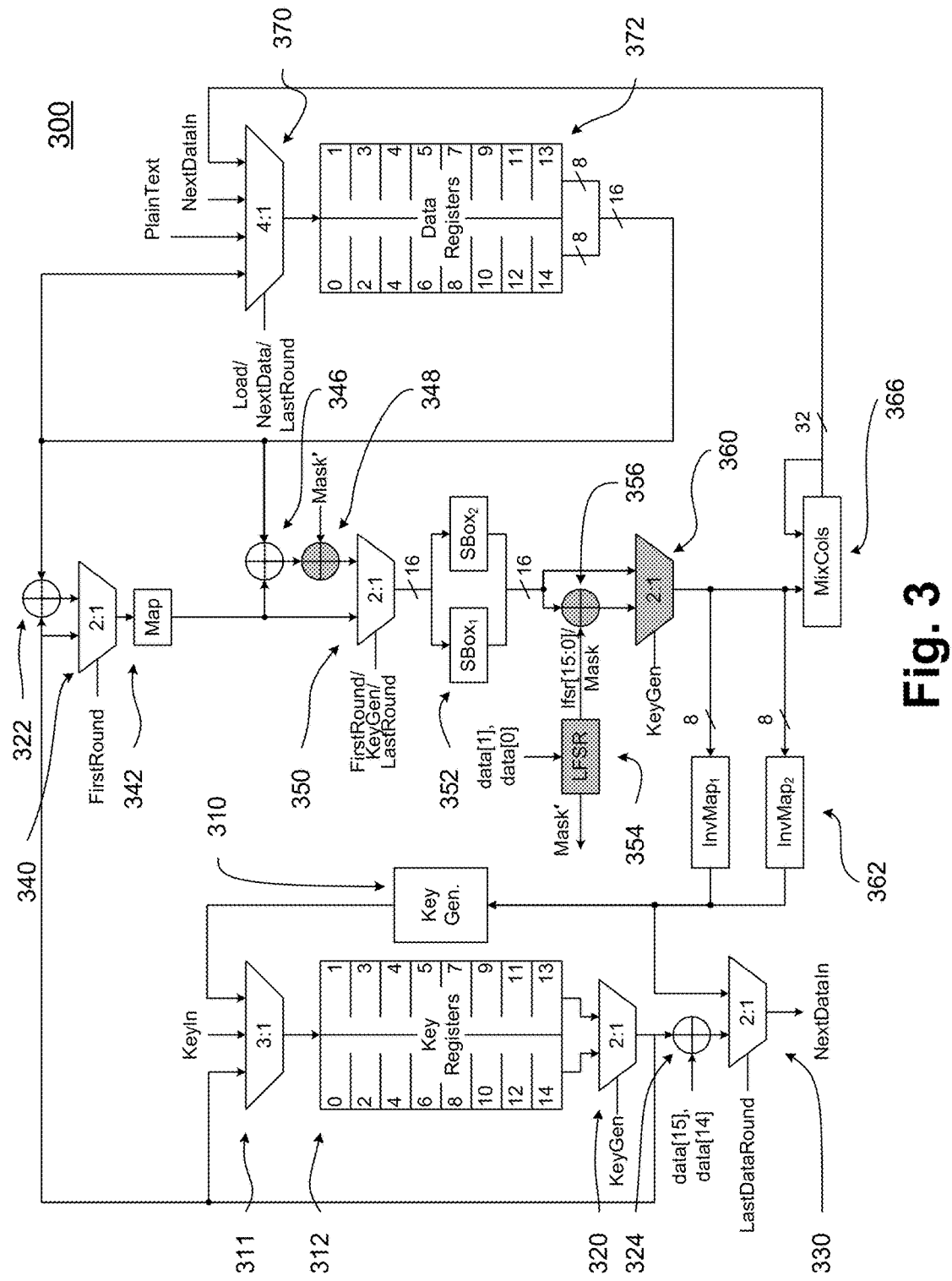
FIG. 3 illustrates an SCA-tolerant AES accelerator incorporating a lightweight masking scheme, in accordance with some embodiments of the disclosure.

FIG. 3 illustrates an SCA-tolerant AES accelerator incorporating a lightweight masking scheme, in accordance with some embodiments of the disclosure. An AES accelerator 300 may comprise a key generation circuitry 310, a pre-key-register multiplexing circuitry 311, a key register circuitry 312, a post-key-register multiplexing circuitry 320, a next-data XOR circuitry 324, and a next-data-in multiplexing circuitry 330. AES accelerator 300 may also comprise a first key-and-data XOR circuitry 322, a first key-and-data multiplexing circuitry 340, a map circuitry 342, a second key-and-data XOR circuitry 346, a second key-and-data multiplexing circuitry 350, an S-box circuitry 352, an inverse map circuitry 362, a mix columns circuitry 366, a pre-data-register multiplexing circuitry 370, and a data register circuitry 372.

The various parts of AES accelerator 300 may be coupled to each other in a manner substantially similar to the manner in which the various parts of AES accelerator 100 are coupled to each other. In addition, in comparison with AES accelerator 100, AES accelerator 300 may comprise a PRG circuitry 354, a mask circuitry 356, a mask removal circuitry 348, and a post-mask multiplexing circuitry 360.

PRG circuitry 354, which may include an LFSR, may have an input coupled to two or more data bits. PRG circuitry 354 may generate a pseudo-random sequence of numbers (which may be an effectively random sequence of numbers for purposes of AES accelerator 300) and a registered copy of the pseudo-random sequence of numbers. In any clock cycle, mask circuitry 356 may XOR an output of S-box circuitry 352 with a pseudo-random values generated by PRG circuitry 354. Meanwhile, mask removal circuitry 348 may XOR an output of data register circuitry 372 with the registered copy of pseudo-random values generated by PRG circuitry 354.

The proposed SCA-tolerant AES accelerator incorporating a lightweight masking scheme may be based on a design incorporating 16-bit internal datapaths in which AES accelerator 300 may include two S-boxes designed to process two incoming bytes of data. However, in various designs, AES accelerator 300 may be scalable to include other numbers of S-boxes to process other numbers of incoming bytes of data, such as four S-boxes to process four bytes, eight S-boxes to process eight bytes, or sixteen S-boxes to process sixteen bytes. Accordingly, the disclosed designs may be scaled to process full AES datapaths.

In the proposed AES accelerator, a random mask may be added with the data prior to a Mix Columns transformation. As the Mix Columns block scales the data with pre-determined factors and writes the data locally into registers, it may be a potential point of vulnerability. Moreover, after the Mix Columns transformation, scaled data bytes may be written into data registers which may be used in a subsequent cycle of operation.

A Mix Columns transformation may advantageously be a point at which a mask is added, such that the data written into registers may be completely randomized and a power signature may be highly uncorrelated to the unmasked data. An advantage of adding a mask at a Mix Columns transformation may be the scaling factors may be chosen such that the sum of the factors in GF field results in 0x1. This property may greatly simplify a mask removal and/or decompensation process to a great extent, such that a compensation value may be added with masked data to retrieve unmasked data.

Figure 4:
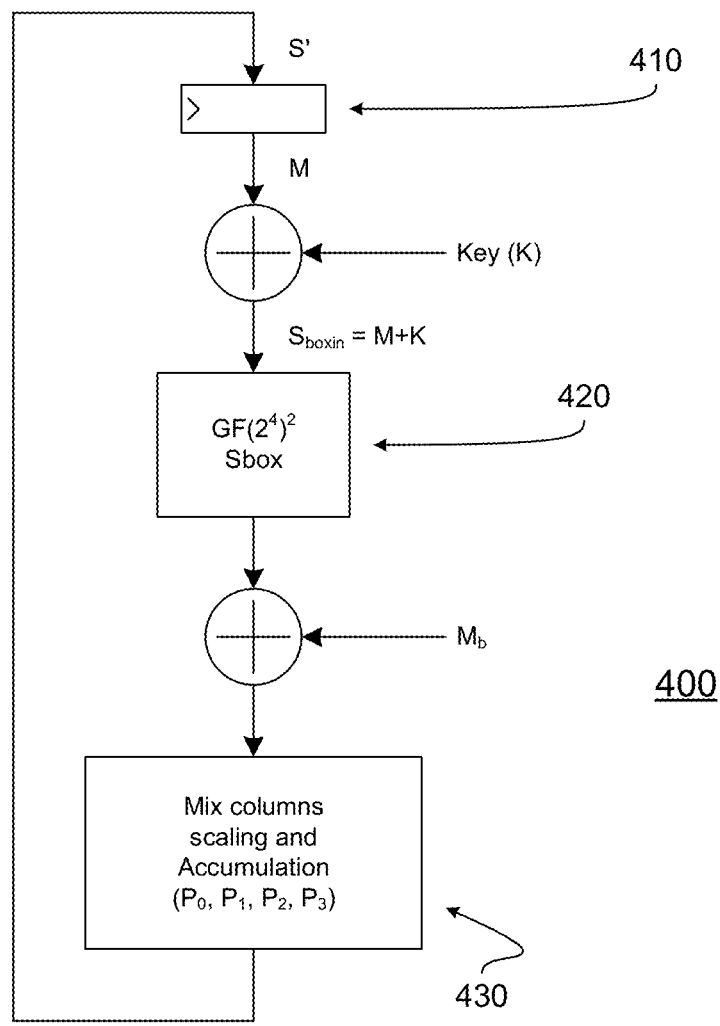
FIG. 4 illustrates AES encryption datapaths in unprotected designs, in accordance with some embodiments of the disclosure.
Figure 5:
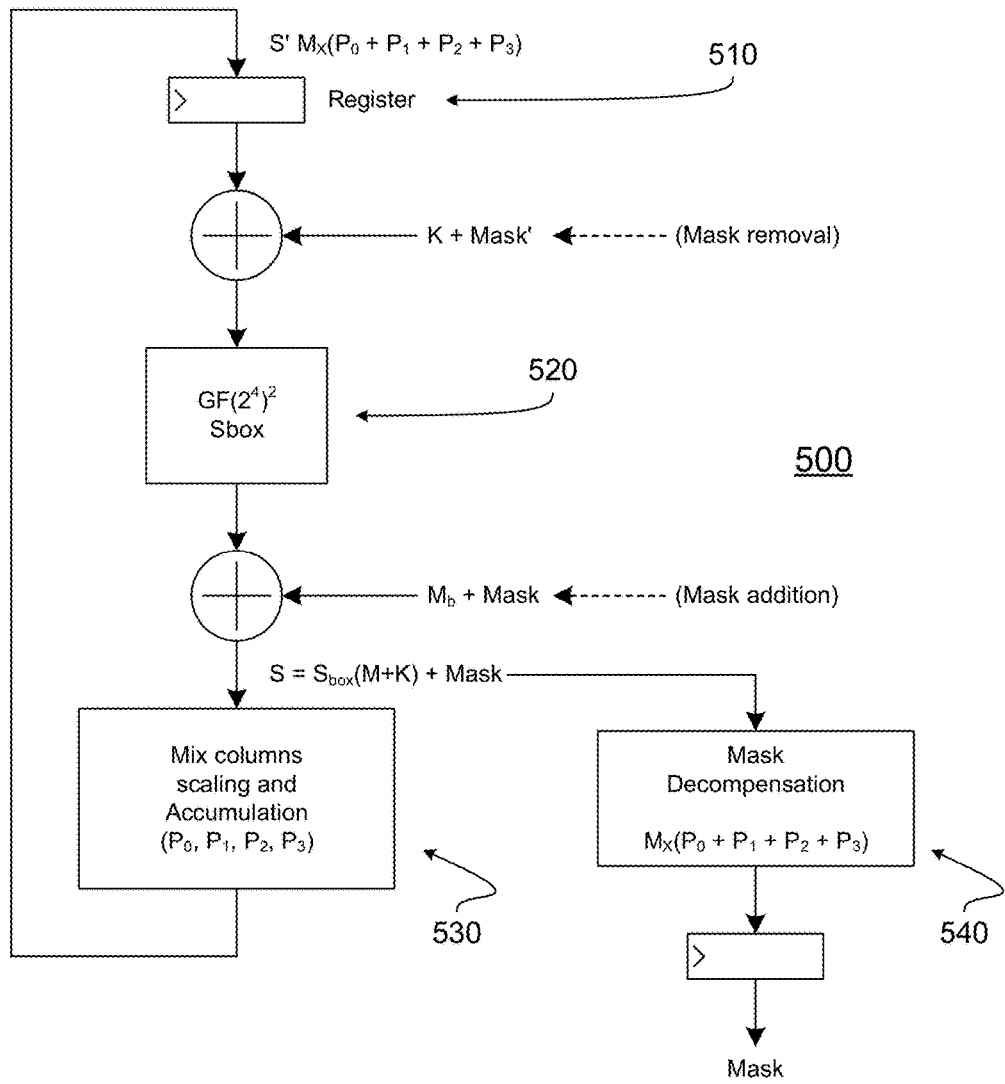
FIG. 5 illustrates AES encryption datapaths in proposed masking designs, in accordance with some embodiments of the disclosure.

FIG. 4 illustrates AES encryption datapaths in unprotected designs, in accordance with some embodiments of the disclosure, and FIG. 5 illustrates AES encryption datapaths in proposed masking designs, in accordance with some embodiments of the disclosure. (Shift Rows transformations are not shown in FIGS. 4 and 5, as they may be implemented at an interconnect level.) In FIG. 4, in an unprotected AES encryption datapath 400, data from a data register 410 may be added with a key (K) and may be provided as an input to an S-box 420 (as $S_{boxin}$=M+K). After the computation of $AX^{-1}$ (where X is $S_{boxin}$), an affine constant Mb may be added. The S-box output may then be sent to a Mix Columns block 430 for scaling and accumulating with pre-determined factors $P_0$, $P_1$, $P_2$ and $P_3$. The resulting data (S') may then be written into data register 410.

In FIG. 5, protected AES encryption datapath 500 may have a data register 510, an S-box 520, and a Mix Columns block 530, and may be substantially similar to unprotected AES encryption datapath 400. However, in protected AES encryption datapath 500, the data written into Mix Columns and data registers are masked using the random mask (Mask) generated by a pseudo-random number generator (which may be an LFSR) to thwart a data/power relationship.

To aid the mask removal process for extracting unmasked data, a mask decompensation circuitry 540 (such as mask removal circuitry 348) may be used. Mask decompensation circuitry 540 may compute a value Mask' ($M \times (P_0+P_1+P_2+P_3)$) and may store it in a local register. For example, the scaling factors in native AES field GF ($2^8$) may be such that $\{P_0, P_1, P_2, P_3\}$ equal $\{0x2, 0x3, 0x1, 0x1\}$. This results in the factor ($P_0+P_1+P_2+P_3$) equaling 0x1. A decompensation value may hence be reduced to the mask value Mask.

Figure 6:
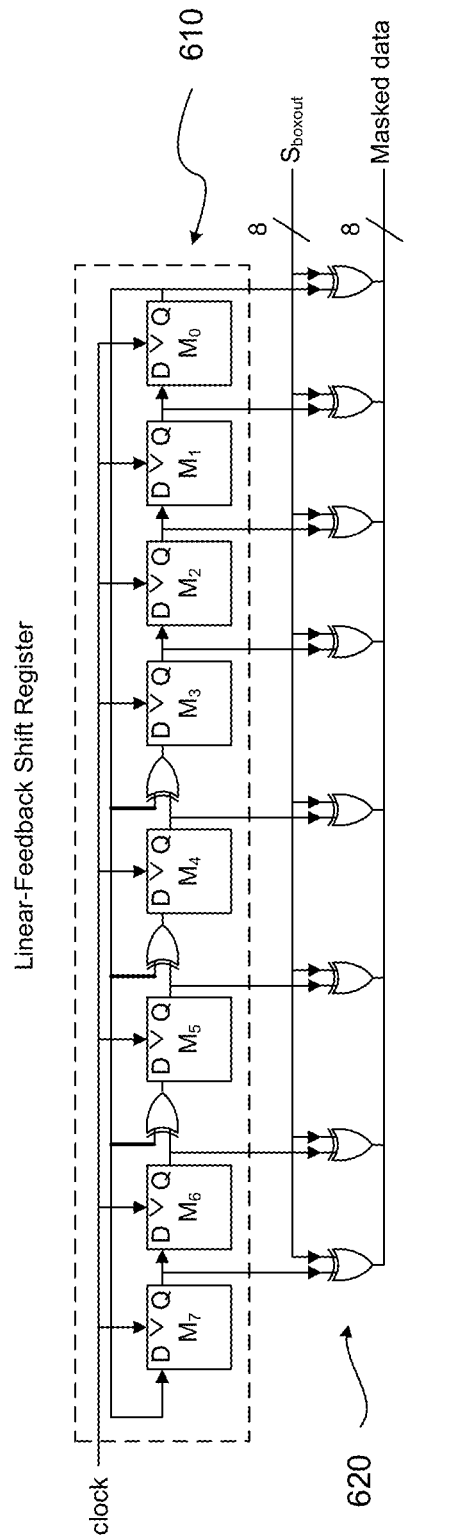
FIG. 6 illustrates a masking arrangement, in accordance with some embodiments of the disclosure.

FIG. 6 illustrates a masking arrangement, in accordance with some embodiments of the disclosure. Masking arrangement 600 may comprise a PRG circuitry 610 and a mask circuitry 620. PRG circuitry 610 may be an LFSR. An output of PRG circuitry 610 may be XORed with an S-box output to produce a masked data.

Returning to FIG. 5, for designs in which a separate mask may be added to each byte of data, a mask decompensation value may be computed accordingly and stored in a register. In such designs, the circuitry required to compute Mask' may comprise (or may consist of) multiplication in addition to XOR operation, and may result in an additional 3% area overhead. During the next round of encryption, the mask decompensation value may be added with data during a key addition process in order to retrieve unmasked data for subsequent operations.

Mask addition may ensure that data written into registers are masked and hence a power signature may be highly uncorrelated to unmasked data under processing. This may advantageously help mitigate any HD or HW based attacks on the registers. Such designs may achieve iso-throughput when compared to a baseline design, while exhibiting between a factor of 2× and a factor of 4× area improvement over conventional masking designs.

A second type of design disclosed herein may be employed for lightweight designs to enforce constant HW distributions across all input bytes. Side-channel based attacks may exploit a data/power relationship in AES accelerators for extracting an embedded secret key. An attacker may collect an extensive set of leakage signatures and may utilize certain statistical models for predicting a secret key byte used in computation. Among different leakage models, power SCAs are highly popular due to their ease in mounting complexities.

One of the most prominent attack models used in power attacks is the HW model, which approximates power consumption with the proportion of number of 1's and 0's in the intermediate states. When a correct key guess is made, the estimated HW values for a set of random encryptions mounted by an attacker may be highly correlated to power signatures collected from the device running the cryptographic algorithm.

Conventional side-channel tolerant designs may employ non-linear masking to mitigate a data/power relationship. In comparison, the second type of design disclosed herein presents a lightweight scheme for mitigating HW model based power SCAs. The designs may employ dual-rail logic masking schemes, which may compute the data and complement versions of the same output byte. This may advantageously help ensure that an intermediate sensitive target value has a constant HW across all the different output byte values. The proposed designs may be based on heterogeneous random-order processing S-box based designs, in which it may be sufficient to choose certain intermediate sensitive values for deploying dual-rail logic masking technique.

In the second type of design, a dual-rail logic mask may ensure a constant proportion of the number of 1's and the number of 0's in an intermediate state. By either adding an extra logic gate, or by incorporating a dual-rail functionality into an existing gate, a desired constant HW across all data bytes may be achieved.

Figure 7:
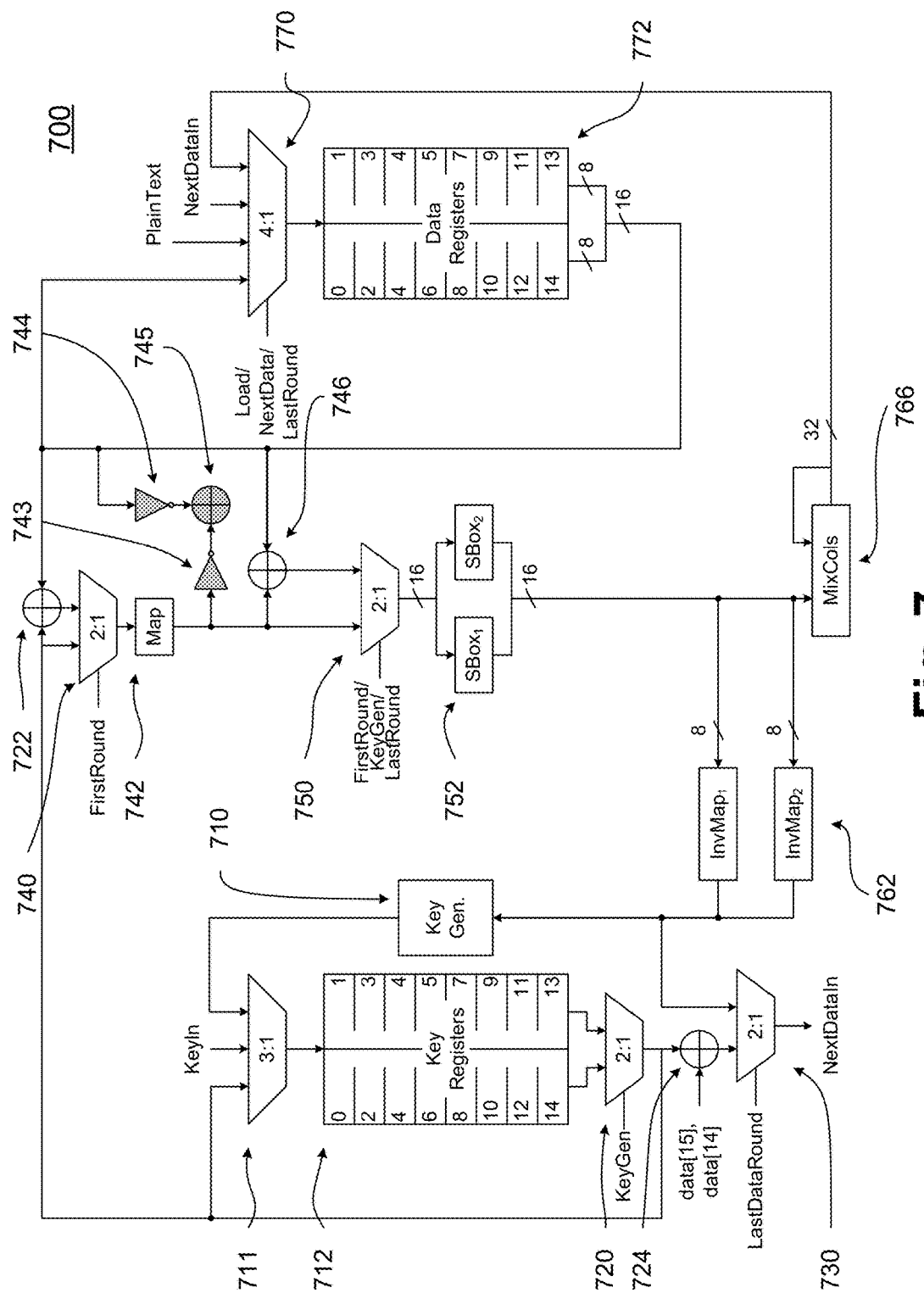
FIG. 7 illustrates an SCA-tolerant AES accelerator with dual-rail masking of S-box inputs, in accordance with some embodiments of the disclosure.

In contrast with conventional designs, masking based designs may exhibit between a factor of 2x and a factor of 4x degradation in terms of area overhead and/or energy consumed. The proposed SCA-tolerant AES accelerators may exhibit less than 1% area overhead and/or energy overhead in comparison with baseline designs lacking any countermeasures. Dual-rail masking schemes (e.g., of S-box inputs) may advantageously help to maintain a constant power-profile across all the possible input byte values of the S-box, by adding few simple logic gates FIG. 7 illustrates an SCA-tolerant AES accelerator with dual-rail masking of S-box inputs, in accordance with some embodiments of the disclosure. An AES accelerator 700 may comprise a key generation circuitry 710, a pre-key-register multiplexing circuitry 711, a key register circuitry 712, a post-key-register multiplexing circuitry 720, a next-data XOR circuitry 724, and a next-data-in multiplexing circuitry 730. AES accelerator 700 may also comprise a first key-and-data XOR circuitry 722, a first key-and-data multiplexing circuitry 740, a map circuitry 742, a second key-and-data XOR circuitry 746, a second key-and-data multiplexing circuitry 750, an S-box circuitry 752, an inverse map circuitry 762, a mix columns circuitry 766, a pre-data-register multiplexing circuitry 770, and a data register circuitry 772.

The various parts of AES accelerator 700 may be coupled to each other in a manner substantially similar to the manner in which the various parts of AES accelerator 100 are coupled to each other. In addition, in comparison with AES accelerator 100, AES accelerator 700 may comprise first inverting circuitry 743, a second inverting circuitry 744, and a Hamming-weight circuitry 745.

First inverting circuitry 743 may have an input coupled to an output of map circuitry 742. Second inverting circuitry 744 may have an input coupled to an output of data register circuitry 772. Hamming-weight circuitry 745 may have a first input coupled to an output of first inverting circuitry 743 and a second input coupled to an output of second inverting circuitry 744.

First inverting circuitry 743 may accordingly compute a complementary version of an input to S-box circuitry 752, and second inverting circuitry 744 may compute a complementary version of an output of data register circuitry 772. The complementary versions thereby created may then be XORed by Hamming-weight circuitry 745. As a result, in various embodiments, key bytes from key register circuitry 712 and data bytes from data register circuitry 772 may be inverted and added together. This inversion and XORing may occur parallel to the XOR performed by second key-and-data XOR circuitry 746 (in which an input coupled to an output of map circuitry 742 is XORed with an input coupled to the output of data register circuitry 772).

In its processing of two bytes every cycle, AES accelerator 700 may advantageously balance output load of data and complementary signals, and a constant HW of 8 across all byte values may be achieved.

The dual-rail masking of AES accelerator 700 may be implemented in the form of additional logic gates (e.g., two invertors and one XOR gate per bit). The dual-rail logic may also be implemented by incorporating data and complementary outputs in the same logic gate.

Figure 8:
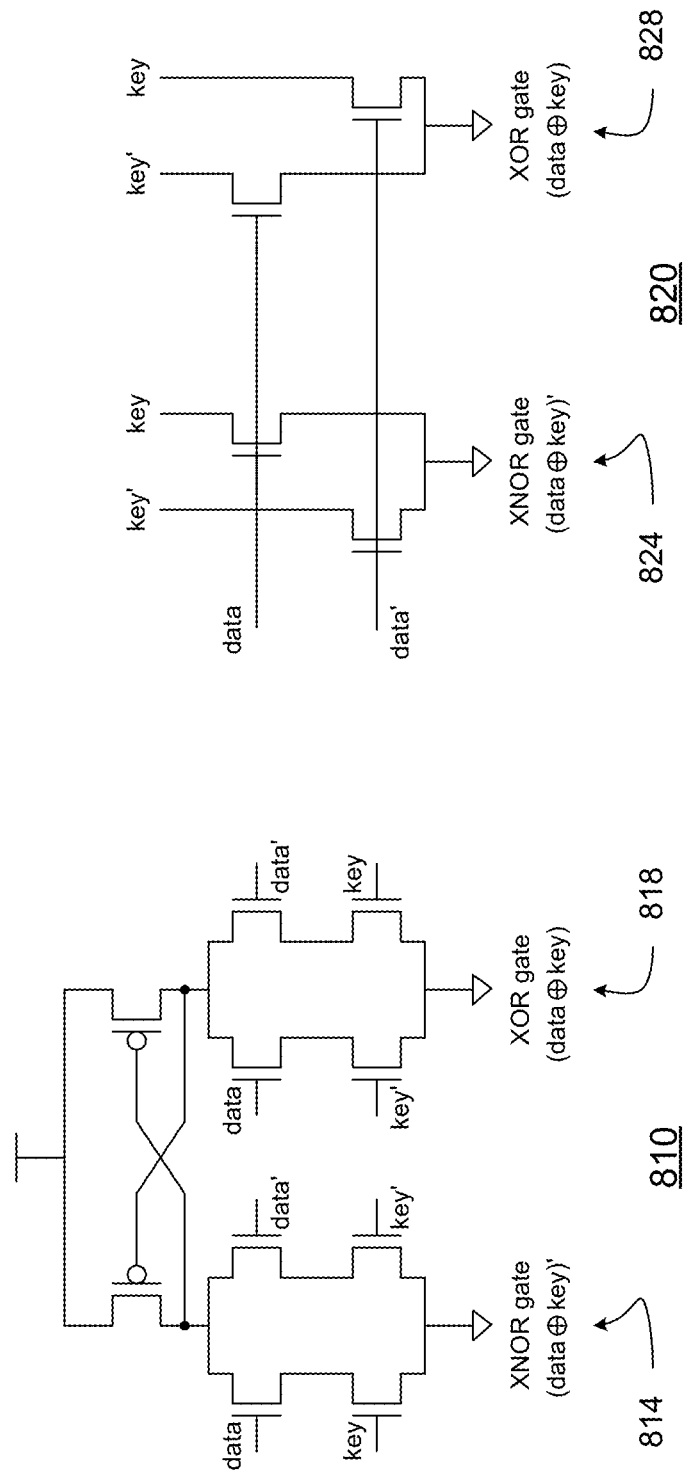
FIG. 8 illustrates dual-rail logic implementations for generating S-box inputs using dynamic logic and complementary pass-transistor logic, in accordance with some embodiments of the disclosure.

FIG. 8 illustrates dual-rail logic implementations for generating S-box inputs using dynamic logic and complementary pass-transistor logic, in accordance with some embodiments of the disclosure. Dual-rail circuitry 810 comprises an XNOR gate 814 and an XOR gate 818. XNOR gate 814 may evaluate an XNOR of a data bit and a key bit, while XOR gate 818 may evaluate an XOR of the data bit and the key bit. Similarly, complementary pass-transistor circuitry 820 may comprise an XNOR gate 824 and an XOR gate 828. XNOR gate 824 may evaluate an XNOR of a data bit and a key bit, while XOR gate 828 may evaluate an XOR of the data bit and the key bit. AES accelerator 700 may accordingly use circuitry such as dual-rail circuitry 810 and/or complementary pass-transistor circuitry 820 to implement first inverting circuitry 743, second inverting circuitry 744, and/or Hamming weight circuitry 745 for obtaining dual-rail logic signals for data and key signals coupled to inputs of the S-box circuitry 752. In various embodiments, dual rail circuitry 810 and/or complementary pass-transistor circuitry 820 may be implemented for each bit of a multiple-bit datapath architecture of first inverting circuitry 743, second inverting circuitry 744, and/or Hamming weight circuitry 745.

Such a full-custom design of dual-rail logic may enable a compact layout and may permit better control over balancing loads on data signals and complementary signals. As a result, such a dual-rail logic design may enable a constant power profile across all byte values.

The proposed design may exhibit less than a ten percent area overhead over conventional designs lacking any countermeasures. The overhead may include all heterogeneous S-box logic and random byte-order switching modules. The overhead from the dual-rail logic masking alone may be less than two percent, which may advantageously provide a significant improvement in area savings over a fully masked AES implementation.

Figure 9:
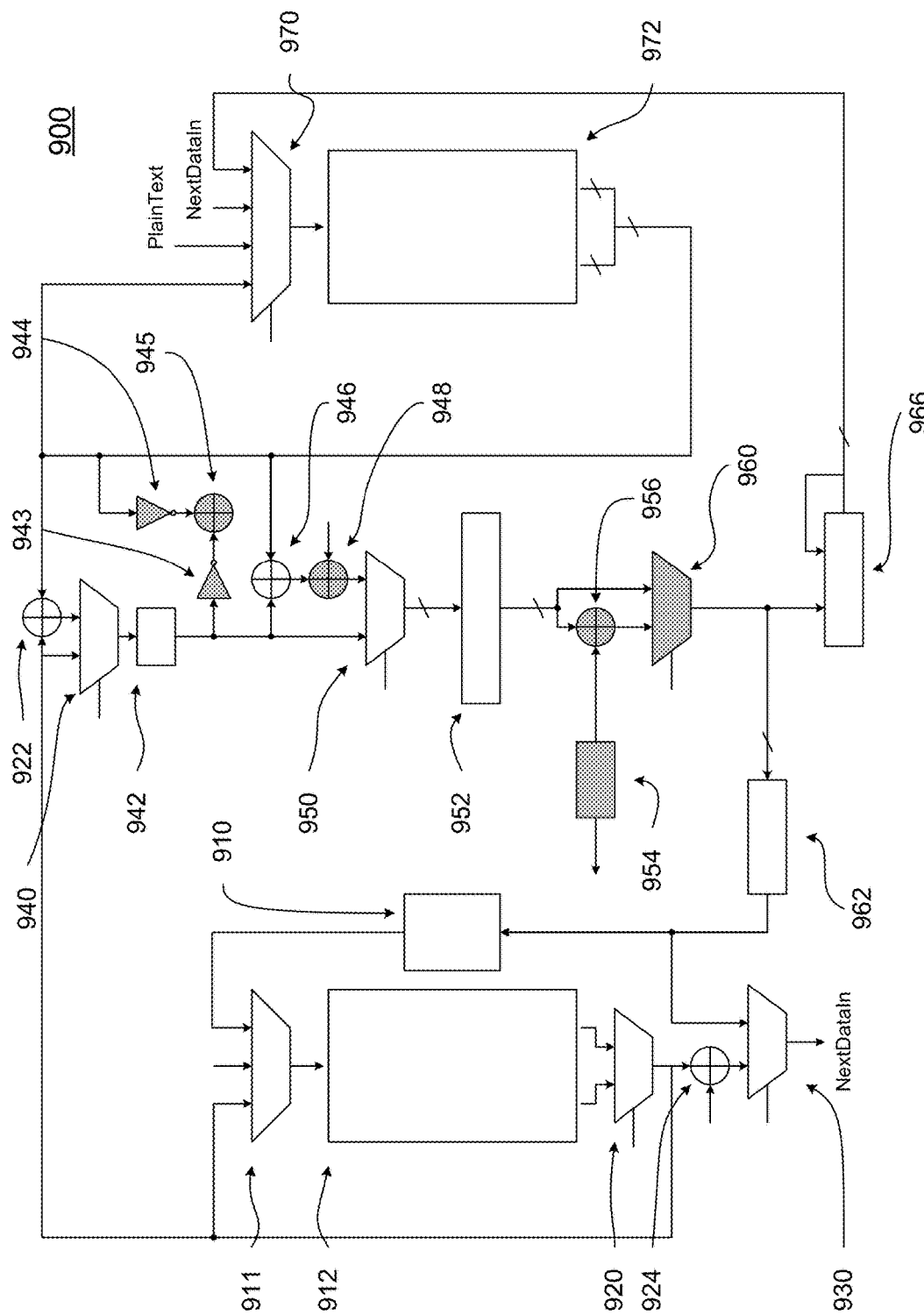
FIG. 9 illustrates an SCA-tolerant AES accelerator incorporating a lightweight masking scheme, dual-rail masking of S-box inputs, or both, in accordance with some embodiments of the disclosure.

FIG. 9 illustrates an SCA-tolerant AES accelerator incorporating a lightweight masking scheme, dual-rail masking of S-box inputs, or both, in accordance with some embodiments of the disclosure. An AES accelerator 900 may comprise a key generation circuitry 910, a pre-key-register multiplexing circuitry 911, a key register circuitry 912, a post-key-register multiplexing circuitry 920, a next-data XOR circuitry 924, and a next-data-in multiplexing circuitry 930. AES accelerator 900 may also comprise a first key-and-data XOR circuitry 922, a first key-and-data multiplexing circuitry 940, a map circuitry 942, a second key-and-data XOR circuitry 946, a second key-and-data multiplexing circuitry 950, an S-box circuitry 952, an inverse map circuitry 962, a mix columns circuitry 966, a pre-data-register multiplexing circuitry 970, and a data register circuitry 972.

The various parts of AES accelerator 900 may be coupled to each other in a manner substantially similar to the manner in which the various parts of AES accelerator 100 are coupled to each other. AES accelerator 900 may also comprise a PRG circuitry 954, a mask circuitry 956, a mask removal circuitry 948, and a post-mask multiplexing circuitry 960, which may be coupled to various parts of AES accelerator 900 in a manner substantially similar to the manner in which similar parts of AES accelerator 300 are coupled to the various parts of AES accelerator 300. In addition, AES accelerator 900 may comprise first inverting circuitry 943, a second inverting circuitry 944, and a Hamming-weight circuitry 945, which may be coupled to various parts of accelerator 900 in a manner substantially similar to the manner in which similar parts of AES accelerator 700 are coupled to the various parts of AES accelerator 700.

Accordingly, AES accelerator 900 may incorporate both the first type of design for extremely lightweight masking designs for disrupting dependencies between externally-visible data and measurable current signatures, and the second type of design for lightweight designs to enforce constant HW distributions across all input bytes.

Various embodiments of AES accelerator 900 may incorporate the first type of design for extremely lightweight masking designs for disrupting dependencies between externally-visible data and measurable current signatures. S-box circuitry 952 may be operable to convert a value on an input of S-box circuitry 952 into a value on an output of S-box circuitry 952 in accordance with an AES Rijndael S-box matrix. PRG circuitry 954 may be operable to provide a sequence of pseudo-random numbers on a first output of PRG circuitry 954 and a registered copy of the sequence on a second output of the PRG circuitry 954. Mask circuitry 956 may be operable to provide an XOR of a value on the output of S-box circuitry 952 and a value on the first output of PRG circuitry 954 onto an output of mask circuitry 956 coupled to an input of data register circuitry 972. Mask removal circuitry 948 may be operable to provide an XOR of a value on an output of data register circuitry 972, a value coupled to an output of key register circuitry 912, and a value on the second output of PRG circuitry 954 onto an output of mask removal circuitry 948 coupled to the input of S-box circuitry 952.

In some embodiments, PRG circuitry 954 may comprise an LFSR. For some embodiments, a width of at least one of the following may be an integer number of bytes: the input of S-box circuitry 952, the output of S-box circuitry 952, the first output of PRG circuitry 954, the second output of PRG circuitry 954, the output of mask circuitry 956, the input of data register circuitry 972, the output of data register circuitry 972, the output of key register circuitry 912, and the output of mask removal circuitry 948. In some embodiments, a width of at least one of the following is two bytes: the input of S-box circuitry 952, the output of S-box circuitry 952, the first output of PRG circuitry 954, the second output of PRG circuitry 954, the output of mask circuitry 956, the input of data register circuitry 972, the output of data register circuitry 972, the output of key register circuitry 912, and the output of mask removal circuitry 948.

For some embodiments, mix-columns circuitry 966 may be operable to convert a value on an input of mix-columns circuitry 966 into a value on an output of mix-columns circuitry 966 in accordance with an AES Rijndael mix columns transformation. In some embodiments, pre-data-register multiplexing circuitry 970 may be a data register multiplexing circuitry having at least a first input coupled to the output of data register circuitry 972, a second input coupled to the output of mix-columns circuitry 966, a selection input, and an output coupled to the input of data register circuitry 972. For some embodiments, post-mask multiplexing circuitry 960 may be a mix-columns multiplexing circuitry having at least a first input coupled to the output of S-box circuitry 952, a second input coupled to the output of mask circuitry 954, a selection input, and an output coupled to the input of mix-columns circuitry 966.

In some embodiments, second key-and-data multiplexing circuitry 950 may be a first S-box multiplexing circuitry having at least a first input coupled to the output of map block 942, a second input coupled to an XOR of the output of key register circuitry 912 and the output of data register circuitry 972, a selection input, and an output coupled to the input of S-box circuitry 952. For some embodiments, post-mask multiplexing circuitry 960 may be a second S-box multiplexing circuitry having at least a first input coupled to the output of the first S-box multiplexing circuitry, a second input coupled to the output of mask removal circuitry 954, a selection input, and an output coupled to the input of S-box circuitry 952.

For some embodiments, first inverting circuitry 943 may be operable to provide an inversion of a value on an input of first inverting circuitry 943 to an output of first inverting circuitry 943, the input of first inverting circuitry 943 being coupled to the output of the first S-box multiplexing circuitry. Second inverting circuitry 944 may be operable to provide an inversion of a value on an input of second inverting circuitry 944 to an output of second inverting circuitry 944, the input of second inverting circuitry 944 being coupled to the output of data register circuitry 972. Hamming-weight circuitry 945 may be operable to perform an XOR of a value on the output of first inverting circuitry 943 and a value on the output of second inverting circuitry 944.

Similarly, various embodiments of AES accelerator 900 may incorporate the first type of design for extremely lightweight masking designs for disrupting dependencies between externally-visible and measurable current signatures. S-box circuitry 952 may be operable to convert a value on an input of S-box circuitry 952 into a value on an output of S-box circuitry 952 in accordance with an AES Rijndael S-box matrix. First inverting circuitry 943 may be operable to provide an inversion of a value on an input of first inverting circuitry 943 to an output of first inverting circuitry 943. Second inverting circuitry 944 may be operable to provide an inversion of a value on an input of second inverting circuitry 944 to an output of second inverting circuitry 944. Hamming-weight circuitry 945 may be operable to perform an XOR of a value on the output of first inverting circuitry 943 and a value on the output of second inverting circuitry 944. The input of first inverting circuitry 943 is coupled to the output of first S-box multiplexing circuitry. In some embodiments, the input of first inverting circuitry 943 may be coupled to at least one of: the input of S-box circuitry 952 and the output of S-box circuitry 952.

In some embodiments, the input of second inverting circuitry 944 may be coupled to an output of data register circuitry 972. For some embodiments, the first S-box multiplexing circuitry may have at least a first input coupled to the output of key register circuitry 912, a second input coupled to an XOR of the output of key register circuitry 912 and the output of data register circuitry 972, a selection input, and an output coupled to the input of S-box circuitry 952. In some embodiments, the second S-box multiplexing circuitry may have at least a first input coupled to the output of the first S-box multiplexing circuitry, a second input coupled to an XOR of the output of data register circuitry 972 and the output of the first S-box multiplexing circuitry, a selection input, and an output coupled to the input of the S-box circuitry. The input of first inverting circuitry 943 may be coupled to the output of the first S-box multiplexing circuitry.

For some embodiments, a width of at least one of the following may be an integer number of bytes: the input of S-box circuitry 952, the output of S-box circuitry 952, the input of first inverting circuitry 943, and the input of second inverting circuitry 944. In some embodiments, a width of at least one of the following may be two bytes: the input of S-box circuitry 952, the output of S-box circuitry 952, the input of first inverting circuitry 943, and the input of second inverting circuitry 944.

In some embodiments, PRG circuitry 954 may be operable to provide a sequence of pseudo-random numbers on a first output of PRG circuitry 954 and a registered copy of the sequence on a second output of PRG circuitry 954. Mask circuitry 956 may be operable to provide an XOR of a value on the output of S box circuitry 952 and a value on the first output of PRG circuitry 954 onto an output of mask circuitry 956 coupled to an input of data register circuitry 972. Mask removal circuitry 948 may be operable to provide an XOR of a value on an output of data register circuitry 972, a value on an output of key register circuitry 912, and a value on the second output of PRG circuitry 954 onto an output of mask removal circuitry 948 coupled to the input of S-box circuitry 952.

Figure 10:
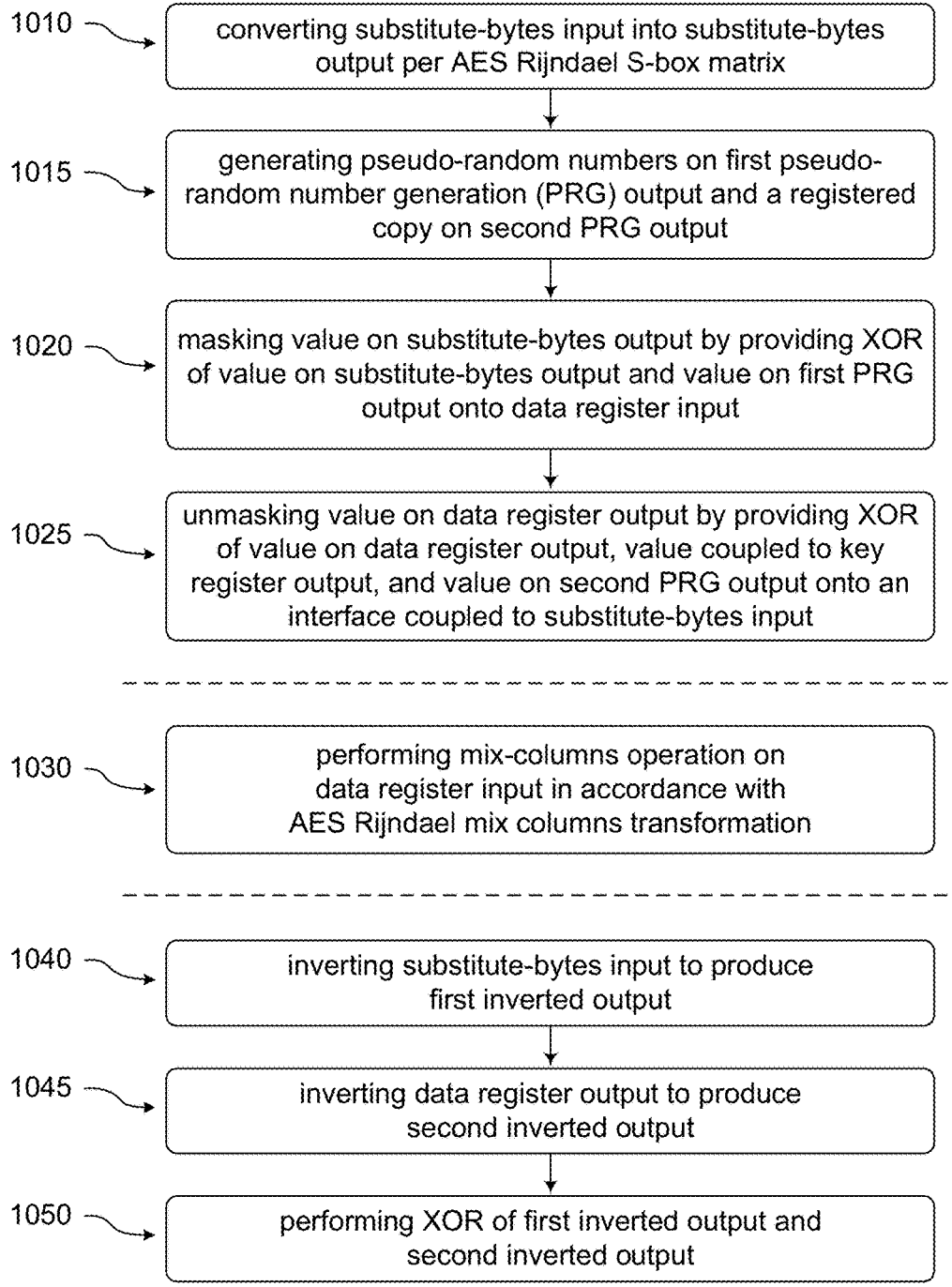
FIG. 10 illustrates methods for incorporating lightweight masking schemes into AES accelerators, in accordance with some embodiments of the disclosure.

FIG. 10 illustrates methods for incorporating lightweight masking schemes into AES accelerators, in accordance with some embodiments of the disclosure. A method 1000 may comprise a converting 1010, a generating 1015, a masking 1020, an unmasking 1025, a performing 1030, an inverting 1040, an inverting 1045, and/or a performing 1050. In converting 1010, a substitute-bytes input may be converted into a substitute-bytes output in accordance with an AES Rijndael S-box matrix. In generating 1015, a sequence of pseudo-random numbers may be generated on a first PRG output and a registered copy of the sequence of pseudo-random numbers may be generated on a second PRG output. In masking 1020, a value on the substitute-bytes output may be masked by providing an XOR of a value on the substitute-bytes output and a value on the first PRG output onto a data register input. In unmasking 1025, a value on a data register output may be unmasked by providing an XOR of a value on the data register output, a value coupled to a key register output, and a value on the second PRG output onto an interface coupled to the substitute-bytes input.

In some embodiments, the sequence of pseudo-random numbers may be generated by an LFSR. For some embodiments, in performing 1030, a mix-columns operation may be performed on the data register input in accordance with an AES Rijndael mix columns transformation. In some embodiments, in inverting 1040, the substitute-bytes input may be inverted to produce a first inverted output. For some embodiments, in inverting 1045, the data register output may be inverted to produce a second inverted output. In some embodiments, in performing 1050, an XOR of the first inverted output and the second inverted output may be performed.

For some embodiments, a width of at least one of the following may be an integer number of bytes: the substitute-bytes input, the substitute-bytes output, the PRG output, the data register input, the data register output, the key register output. In some embodiments, a width of at least one of the following may be two bytes: the substitute-bytes input, the substitute-bytes output, the PRG output, the data register input, the data register output, the key register output.

Figure 11:
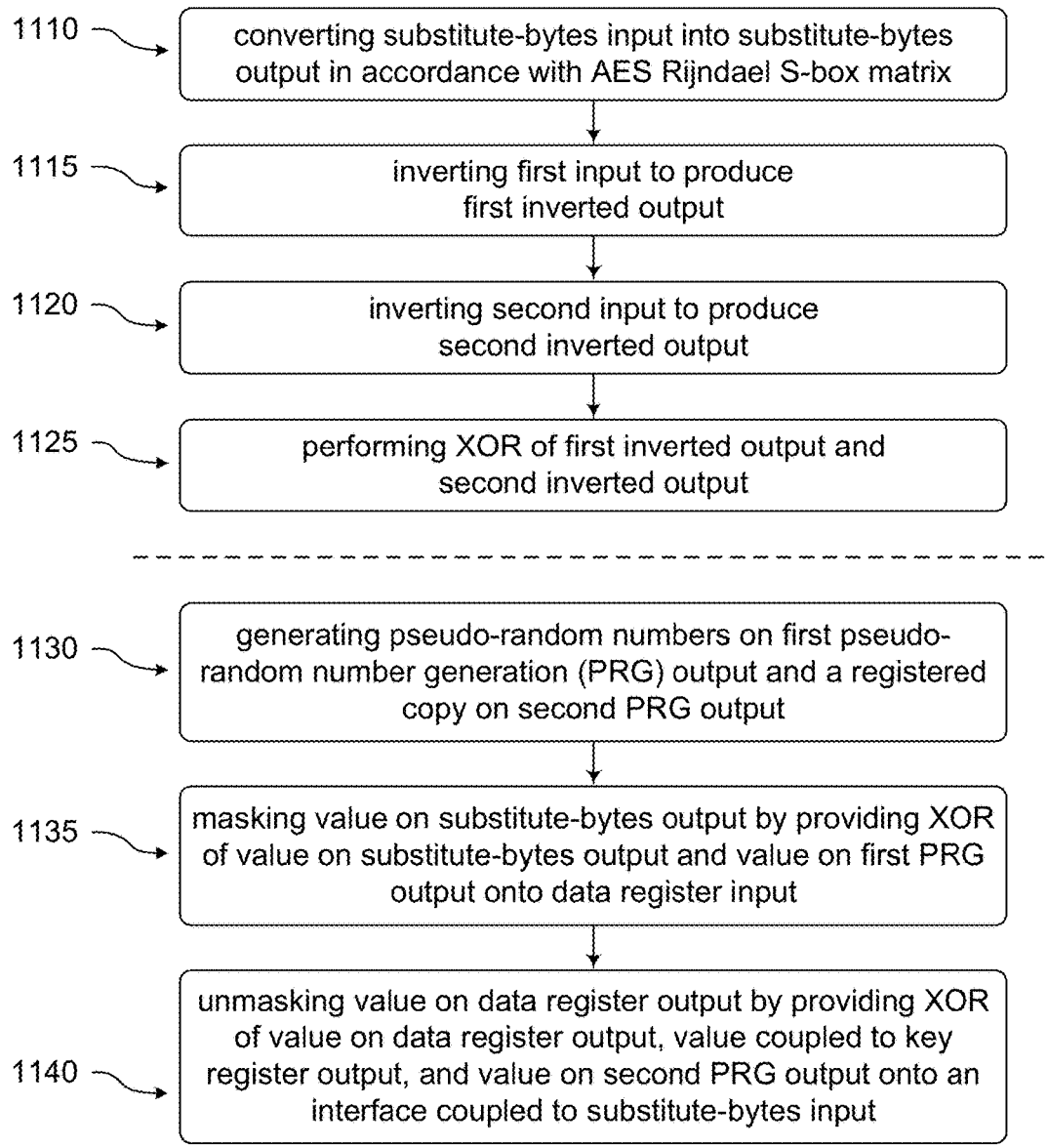
FIG. 11 illustrates methods for incorporating dual-rail masking of S-box inputs into AES accelerators, in accordance with some embodiments of the disclosure.

FIG. 11 illustrates methods for incorporating dual-rail masking of S-box inputs into AES accelerators, in accordance with some embodiments of the disclosure. A method 1100 may comprise a converting 1110, an inverting 1115, an inverting 1120, a performing 1125, a generating 1130, a masking 1135, and/or an unmasking 1140. In converting 1110, a substitute-bytes input may be converted into a substitute-bytes output in accordance with an AES Rijndael S-box matrix. In inverting 1115, a first input may be inverted to produce a first inverted output. In inverting 1120, a second input may be inverted to produce a second inverted output. In performing 1125, an XOR of the first inverted output and the second inverted output may be performed. The first input may be coupled to at least one of: the substitute-bytes input, and the substitute-bytes output, and the second input may be coupled to an output of a data register circuitry.

In some embodiments, a width of at least one of the following may be an integer number of bytes: the substitute-bytes input, the substitute-bytes output, the first inverted output, the second inverted output, and the output of the data register circuitry. For some embodiments, a width of at least one of the following may be two bytes: the substitute-bytes input, the substitute-bytes output, the first inverted output, the second inverted output, and the output of the data register circuitry.

For some embodiments, in generating 1130, a sequence of pseudo-random numbers may be generated on a first PRG output and a registered copy of the sequence of pseudo-random numbers may be generated on a second PRG output. In some embodiments, in masking 1135, a value on the substitute-bytes output may be masked by providing an XOR of a value on the substitute-bytes output and a value on the first PRG output onto a data register input. For some embodiments, in unmasking 1140, a value on a data register output may be unmasked by providing an XOR of a value on the data register output, a value on a key register output, and a value on the second PRG output onto an interface coupled to the substitute-bytes input.

Although the actions in the flowchart with reference to FIGS. 10 and 11 are shown in a particular order, the order of the actions can be modified. Thus, the illustrated embodiments can be performed in a different order, and some actions may be performed in parallel. Some of the actions and/or operations listed in FIGS. 10 and 11 are optional in accordance with certain embodiments. The numbering of the actions presented is for the sake of clarity and is not intended to prescribe an order of operations in which the various actions must occur. Additionally, operations from the various flows may be utilized in a variety of combinations.

In some embodiments, an apparatus may comprise means for performing various actions and/or operations of the methods of FIGS. 10 and 11.

Moreover, in some embodiments, machine readable storage media may have executable instructions that, when executed, cause one or more processors to perform an operation comprising the methods of FIGS. 10 and 11. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

Figure 12:
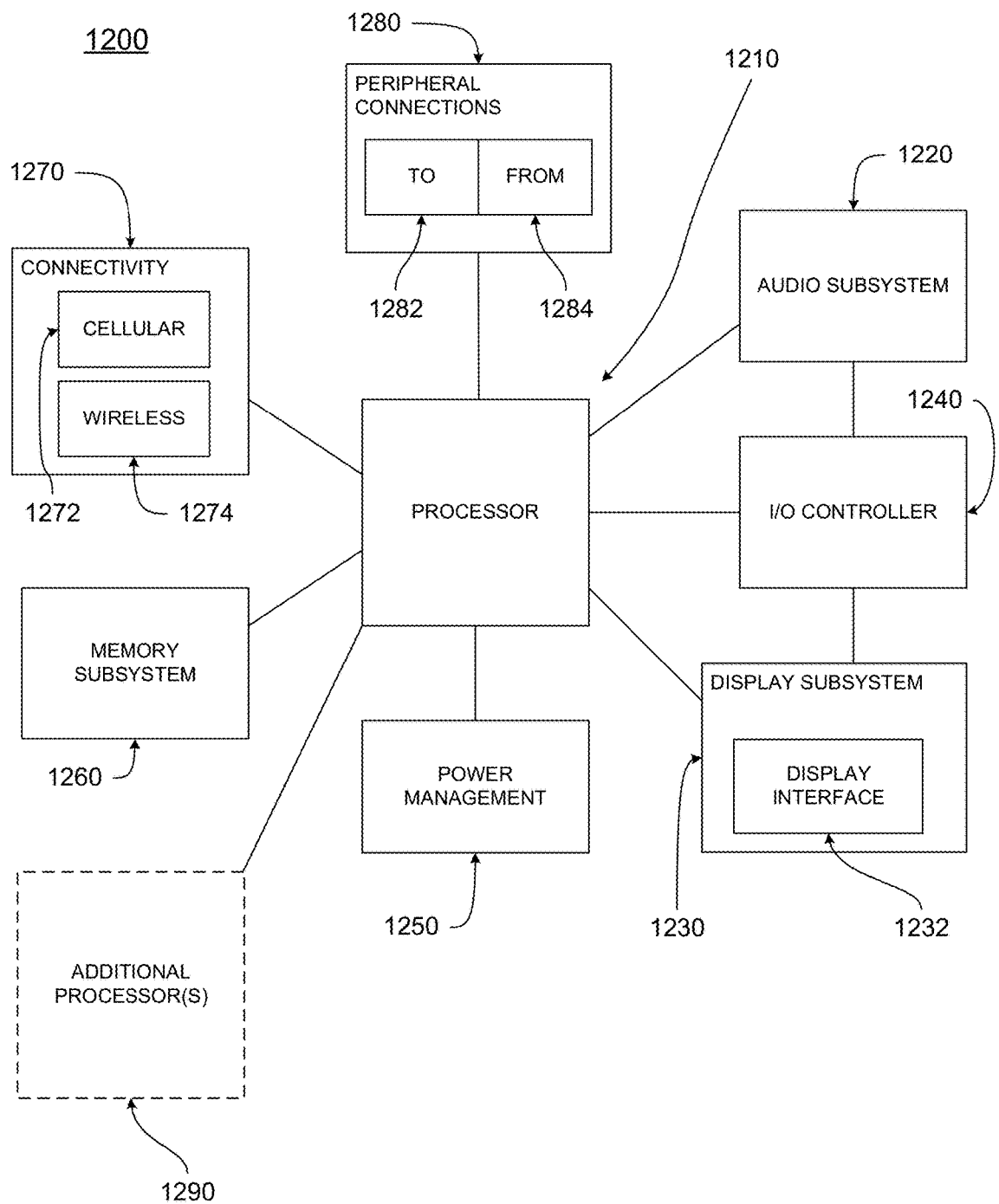
FIG. 12 illustrates a computing device with an SCA-tolerant AES accelerator incorporating a lightweight masking scheme, dual-rail masking of S-box inputs, or both, in accordance with some embodiments of the disclosure.

FIG. 12 illustrates a computing device with an SCA-tolerant AES accelerator incorporating a lightweight masking scheme, dual-rail masking of S-box inputs, or both, in accordance with some embodiments of the disclosure. Computing device 1200 may be a computer system, a System-on-a-Chip (SoC), a tablet, a mobile device, a smart device, or a smart phone with an SCA-tolerant AES accelerator incorporating a lightweight masking scheme, dual-rail masking of S-box inputs, or both, in accordance with some embodiments of the disclosure. It will be understood that certain components of computing device 1200 are shown generally, and not all components of such a device are shown FIG. 12. Moreover, while some of the components may be physically separate, others may be integrated within the same physical package, or even on the same physical silicon die. Accordingly, the separation between the various components as depicted in FIG. 12 may not be physical in some cases, but may instead be a functional separation. It is also pointed out that those elements of FIG. 12 having the same names or reference numbers as the elements of any other figure can operate or function in any manner similar to that described, but are not limited to such.

In various embodiments, the components of computing device 1200 may include any of a processor 1210, an audio subsystem 1220, a display subsystem 1230, an I/O controller 1240, a power management component 1250, a memory subsystem 1260, a connectivity component 1270, one or more peripheral connections 1280, and one or more additional processors 1290. In some embodiments, processor 1210 may include an SCA-tolerant AES accelerator incorporating a lightweight masking scheme, dual-rail masking of S-box inputs, or both, in accordance with some embodiments of the disclosure. In various embodiments, however, any of the components of computing device 1200 may include an SCA-tolerant AES accelerator incorporating a lightweight masking scheme, dual-rail masking of S-box inputs, or both, in accordance with some embodiments of the disclosure. In addition, one or more components of computing device 1200 may include an interconnect fabric having a plurality of ports, such as a router, a network of routers, or a Network-on-a-Chip (NoC).

In some embodiments, computing device 1200 may be a mobile device which may be operable to use flat surface interface connectors. In one embodiment, computing device 1200 may be a mobile computing device, such as a computing tablet, a mobile phone or smart-phone, a wireless-enabled e-reader, or other wireless mobile device. The various embodiments of the present disclosure may also comprise a network interface within 1270 such as a wireless interface so that a system embodiment may be incorporated into a wireless device, for example a cell phone or personal digital assistant.

Processor 1210 may be a general-purpose processor or CPU (Central Processing Unit). In some embodiments, processor 1210 may include one or more physical devices, such as microprocessors, application processors, microcontrollers, programmable logic devices, or other processing means. The processing operations performed by processor 1210 may include the execution of an operating platform or operating system on which applications and/or device functions may then be executed. The processing operations may also include operations related to one or more of the following: audio I/O; display I/O; power management; connecting computing device 1200 to another device; and/or I/O (input/output) with a human user or with other devices.

Audio subsystem 1220 may include hardware components (e.g., audio hardware and audio circuits) and software components (e.g., drivers and/or codecs) associated with providing audio functions to computing device 1200. Audio functions can include speaker and/or headphone output as well as microphone input. Devices for such functions can be integrated into computing device 1200, or connected to computing device 1200. In one embodiment, a user interacts with computing device 1200 by providing audio commands that are received and processed by processor 1210.

Display subsystem 1230 may include hardware components (e.g., display devices) and software components (e.g., drivers) that provide a visual and/or tactile display for a user to interact with computing device 1200. Display subsystem 1230 may include a display interface 1232, which may be a particular screen or hardware device used to provide a display to a user. In one embodiment, display interface 1232 includes logic separate from processor 1210 to perform at least some processing related to the display. In some embodiments, display subsystem 1230 includes a touch screen (or touch pad) device that provides both output and input to a user.

I/O controller 1240 may include hardware devices and software components related to interaction with a user. I/O controller 1240 may be operable to manage hardware that is part of audio subsystem 1220 and/or display subsystem 1230. Additionally, I/O controller 1240 may be a connection point for additional devices that connect to computing device 1200, through which a user might interact with the system. For example, devices that can be attached to computing device 1200 might include microphone devices, speaker or stereo systems, video systems or other display devices, keyboard or keypad devices, or other I/O devices for use with specific applications such as card readers or other devices.

As mentioned above, I/O controller 1240 can interact with audio subsystem 1220 and/or display subsystem 1230. For example, input through a microphone or other audio device can provide input or commands for one or more applications or functions of computing device 1200. Additionally, audio output can be provided instead of, or in addition to, display output. In another example, if display subsystem 1230 includes a touch screen, the display device may also act as an input device, which can be at least partially managed by I/O controller 1240. There can also be additional buttons or switches on computing device 1200 to provide I/O functions managed by I/O controller 1240.

In some embodiments, I/O controller 1240 manages devices such as accelerometers, cameras, light sensors or other environmental sensors, or other hardware that can be included in computing device 1200. The input can be part of direct user interaction, and may provide environmental input to the system to influence its operations (such as filtering for noise, adjusting displays for brightness detection, applying a flash for a camera, or other features).

Power management component 1250 may include hardware components (e.g., power management devices and/or circuitry) and software components (e.g., drivers and/or firmware) associated with managing battery power usage, battery charging, and features related to power saving operation.

Memory subsystem 1260 may include one or more memory devices for storing information in computing device 1200. Memory subsystem 1260 can include nonvolatile memory devices (whose state does not change if power to the memory device is interrupted) and/or volatile memory devices (whose state is indeterminate if power to the memory device is interrupted). Memory subsystem 1260 can store application data, user data, music, photos, documents, or other data, as well as system data (whether long-term or temporary) related to the execution of the applications and functions of computing device 1200.

Some portion of memory subsystem 1260 may also be provided as a non-transitory machine-readable medium for storing the computer-executable instructions (e.g., instructions to implement any other processes discussed herein). The machine-readable medium may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, some embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity component 1270 may include a network interface, such as a cellular interface 1272 or a wireless interface 1274 (so that an embodiment of computing device 1200 may be incorporated into a wireless device such as a cellular phone or a personal digital assistant). In some embodiments, connectivity component 1270 includes hardware devices (e.g., wireless and/or wired connectors and communication hardware) and software components (e.g., drivers and/or protocol stacks) to enable computing device 1200 to communicate with external devices. Computing device 1200 could include separate devices, such as other computing devices, wireless access points or base stations, as well as peripherals such as headsets, printers, or other devices.

In some embodiments, connectivity component 1270 can include multiple different types of network interfaces, such as one or more wireless interfaces for allowing processor 1210 to communicate with another device. To generalize, computing device 1200 is illustrated with cellular interface 1272 and wireless interface 1274. Cellular interface 1272 refers generally to wireless interfaces to cellular networks provided by cellular network carriers, such as provided via GSM or variations or derivatives, CDMA (code division multiple access) or variations or derivatives, TDM (time division multiplexing) or variations or derivatives, or other cellular service standards. Wireless interface 1274 refers generally to non-cellular wireless interfaces, and can include personal area networks (such as Bluetooth, Near Field, etc.), local area networks (such as Wi-Fi), and/or wide area networks (such as WiMax), or other wireless communication.

Peripheral connections 1280 may include hardware interfaces and connectors, as well as software components (e.g., drivers and/or protocol stacks) to make peripheral connections. It will be understood that computing device 1200 could both be a peripheral device to other computing devices (via "to" 1282), as well as have peripheral devices connected to it (via "from" 1284). The computing device 1200 may have a "docking" connector to connect to other computing devices for purposes such as managing content on computing device 1200 (e.g., downloading and/or uploading, changing, synchronizing). Additionally, a docking connector can allow computing device 1200 to connect to certain peripherals that allow computing device 1200 to control content output, for example, to audiovisual or other systems.

In addition to a proprietary docking connector or other proprietary connection hardware, computing device 1200 can make peripheral connections 1280 via common or standards-based connectors. Common types of connectors can include a Universal Serial Bus (USB) connector (which can include any of a number of different hardware interfaces), a DisplayPort or MiniDisplayPort (MDP) connector, a High Definition Multimedia Interface (HDMI) connector, a Firewire connector, or other types of connectors.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

An example provides an apparatus comprising: a first circuitry operable to convert a value on an input of the first circuitry into a value on an output of the first circuitry in accordance with an encryption matrix; a second circuitry operable to provide a sequence of pseudo-random numbers on a first output of the second circuitry and a registered copy of the sequence on a second output of the second circuitry; and a third circuitry operable to provide an XOR of a value on the output of the first circuitry and a value on the first output of the second circuitry onto an output of the third circuitry coupled to an input of a fourth circuitry.

Some embodiments provide an apparatus comprising: a fifth circuitry operable to provide an XOR of a value on an output of the fourth circuitry, a value coupled to an output of a sixth circuitry, and a value on the second output of the second circuitry onto an output of the fifth circuitry coupled to the input of the first circuitry.

Some embodiments provide an apparatus wherein the second circuitry comprises a Linear-Feedback Shift Register (LFSR).

Some embodiments provide an apparatus wherein a width of at least one of the following is an integer number of bytes: the input of the first circuitry, the output of the first circuitry, the first output of the second circuitry, the second output of the second circuitry, the output of the third circuitry, the input of the fourth circuitry, the output of the fourth circuitry, the output of the sixth circuitry, and the output of the fifth circuitry.

Some embodiments provide an apparatus wherein a width of at least one of the following is two bytes: the input of the first circuitry, the output of the first circuitry, the first output of the second circuitry, the second output of the second circuitry, the output of the third circuitry, the input of the fourth circuitry, the output of the fourth circuitry, the output of the sixth circuitry, and the output of the fifth circuitry.

Some embodiments provide an apparatus comprising: a seventh circuitry operable to convert a value on an input of the seventh circuitry into a value on an output of the seventh circuitry in accordance with a transformation process.

Some embodiments provide an apparatus comprising: an eighth circuitry having at least a first input coupled to the output of the fourth circuitry, a second input coupled to the output of the seventh circuitry, a selection input, and an output coupled to the input of the fourth circuitry.

Some embodiments provide an apparatus comprising: a ninth circuitry having at least a first input coupled to the output of the first circuitry, a second input coupled to the output of the third circuitry, a selection input, and an output coupled to the input of the seventh circuitry.

Some embodiments provide an apparatus of various of the examples above comprising: a tenth circuitry having at least a first input coupled to the output of the sixth circuitry, a second input coupled to an XOR of the output of the sixth circuitry and the output of the fourth circuitry, a selection input, and an output coupled to the input of the first circuitry.

Some embodiments provide an apparatus comprising: an eleventh circuitry having at least a first input coupled to the output of the tenth circuitry, a second input coupled to the output of the fifth circuitry, a selection input, and an output coupled to the input of the first circuitry.

Some embodiments provide an apparatus comprising: a twelfth circuitry operable to provide an inversion of a value on an input of the twelfth circuitry to an output of the twelfth circuitry, the input of the twelfth circuitry being coupled to the output of the tenth circuitry; a thirteenth circuitry operable to provide an inversion of a value on an input of the thirteenth circuitry to an output of the thirteenth circuitry, the input of the thirteenth circuitry being coupled to the output of the fourth circuitry; and a fourteenth circuitry operable to perform an XOR of a value on the output of the twelfth circuitry and a value on the output of the thirteenth circuitry.

An example provides a system comprising a memory, a processor coupled to the memory, and a wireless interface for allowing the processor to communicate with another device, the system including the apparatus of various of the examples above.

An example provides a system comprising a memory, a processor coupled to the memory, and a wireless interface for allowing the processor to communicate with another device, the processor including: a first circuitry operable to convert a value on an input of the first circuitry into a value on an output of the first circuitry in accordance with an encryption matrix; a second circuitry operable to provide a sequence of pseudo-random numbers on a first output of the second circuitry and a registered copy of the sequence on a second output of the second circuitry; and a third circuitry operable to provide an XOR of a value on the output of the first circuitry and a value on the first output of the second circuitry onto an output of the third circuitry coupled to an input of a fourth circuitry.

Some embodiments provide a system comprising: a fifth circuitry operable to provide an XOR of a value on an output of the fourth circuitry, a value coupled to an output of a sixth circuitry, and a value on the second output of the second circuitry onto an output of the fifth circuitry coupled to the input of the first circuitry; a seventh circuitry operable to convert a value on an input of the seventh circuitry into a value on an output of the seventh circuitry in accordance with a transformation process, wherein the second circuitry comprises a Linear-Feedback Shift Register (LFSR).

Some embodiments provide a system comprising: an eighth circuitry having at least a first input coupled to the output of the fourth circuitry, a second input coupled to the output of the seventh circuitry, a selection input, and an output coupled to the input of the fourth circuitry; a ninth circuitry having at least a first input coupled to the output of the first circuitry, a second input coupled to the output of the third circuitry, a selection input, and an output coupled to the input of the seventh circuitry; a tenth circuitry having at least a first input coupled to the output of the sixth circuitry, a second input coupled to an XOR of the output of the sixth circuitry and the output of the fourth circuitry, a selection input, and an output coupled to the input of the first circuitry; and an eleventh circuitry having at least a first input coupled to the output of the tenth circuitry, a second input coupled to the output of the fifth circuitry, a selection input, and an output coupled to the input of the first circuitry.

Some embodiments provide a system comprising: a twelfth circuitry operable to provide an inversion of a value on an input of the twelfth circuitry to an output of the twelfth circuitry, the input of the twelfth circuitry being coupled to the output of the tenth circuitry; a thirteenth circuitry operable to provide an inversion of a value on an input of the thirteenth circuitry to an output of the thirteenth circuitry, the input of the thirteenth circuitry being coupled to the output of the fourth circuitry; and a fourteenth circuitry operable to perform an XOR of a value on the output of the twelfth circuitry and a value on the output of the thirteenth circuitry.

An example provides a method comprising: converting a substitute-bytes input into a substitute-bytes output in accordance with an Advanced Encryption Standard (AES) Rijndael S-box matrix; generating a sequence of pseudo-random numbers on a first pseudo-random number generation (PRG) output and a registered copy of the sequence of pseudo-random numbers on a second PRG output; and masking a value on the substitute-bytes output by providing an XOR of a value on the substitute-bytes output and a value on the first PRG output onto a data register input.

Some embodiments provide a method comprising: unmasking a value on a data register output by providing an XOR of a value on the data register output, a value coupled to a key register output, and a value on the second PRG output onto an interface coupled to the substitute-bytes input, wherein the sequence of pseudo-random numbers is generated by a Linear-Feedback Shift Register (LFSR).

Some embodiments provide a method comprising: performing a mix-columns operation on the data register input in accordance with an AES Rijndael mix columns transformation.

Some embodiments provide a method comprising: inverting the substitute-bytes input to produce a first inverted output; inverting the data register output to produce a second inverted output; and performing an XOR of the first inverted output and the second inverted output.

Some embodiments provide a method wherein a width of at least one of the following is an integer number of bytes: the substitute-bytes input, the substitute-bytes output, the PRG output, the data register input, the data register output, the key register output.

Some embodiments provide a method wherein a width of at least one of the following is two bytes: the substitute-bytes input, the substitute-bytes output, the PRG output, the data register input, the data register output, the key register output.

An example provides a machine readable storage media having machine executable instructions stored thereon that, when executed, cause one or more processors to perform a method according to various of the examples above.

An example provides an apparatus comprising: means for converting a substitute-bytes input into a substitute-bytes output in accordance with an Advanced Encryption Standard (AES) Rijndael S-box matrix; means for generating a sequence of pseudo-random numbers on a first pseudo-random number generation (PRG) output and a registered copy of the sequence of pseudo-random numbers on a second PRG output; and means for masking a value on the substitute-bytes output by providing an XOR of a value on the substitute-bytes output and a value on the first PRG output onto a data register input.

Some embodiments provide an apparatus comprising: means for unmasking a value on a data register output by providing an XOR of a value on the data register output, a value coupled to a key register output, and a value on the second PRG output onto an interface coupled to the substitute-bytes input, wherein the sequence of pseudo-random numbers is generated by a Linear-Feedback Shift Register (LFSR).

Some embodiments provide an apparatus comprising: means for performing a mix-columns operation on the data register input in accordance with an AES Rijndael mix columns transformation.

Some embodiments provide an apparatus comprising: means for inverting the substitute-bytes input to produce a first inverted output; means for inverting the data register output to produce a second inverted output; and means for performing an XOR of the first inverted output and the second inverted output.

Some embodiments provide an apparatus wherein a width of at least one of the following is an integer number of bytes: the substitute-bytes input, the substitute-bytes output, the PRG output, the data register input, the data register output, the key register output.

Some embodiments provide an apparatus wherein a width of at least one of the following is two bytes: the substitute-bytes input, the substitute-bytes output, the PRG output, the data register input, the data register output, the key register output.

An example provides a machine readable storage media having machine executable instructions stored thereon that, when executed, cause one or more processors to perform an operation comprising: convert a substitute-bytes input into a substitute-bytes output in accordance with an Advanced Encryption Standard (AES) Rijndael S-box matrix; generate a sequence of pseudo-random numbers on a first pseudo-random number generation (PRG) output and a registered copy of the sequence of pseudo-random numbers on a second PRG output; and mask a value on the substitute-bytes output by providing an XOR of a value on the substitute-bytes output and a value on the first PRG output onto a data register input.

Some embodiments provide a machine readable storage media comprising: unmask a value on a data register output by providing an XOR of a value on the data register output, a value coupled to a key register output, and a value on the second PRG output onto an interface coupled to the substitute-bytes input, wherein the sequence of pseudo-random numbers is generated by a Linear-Feedback Shift Register (LFSR).

Some embodiments provide a machine readable storage media comprising: perform a mix-columns operation on the data register input in accordance with an AES Rijndael mix columns transformation.

Some embodiments provide a machine readable storage media comprising: invert the substitute-bytes input to produce a first inverted output; invert the data register output to produce a second inverted output; and perform an XOR of the first inverted output and the second inverted output.

Some embodiments provide a machine readable storage media wherein a width of at least one of the following is an integer number of bytes: the substitute-bytes input, the substitute-bytes output, the PRG output, the data register input, the data register output, the key register output.

Some embodiments provide a machine readable storage media wherein a width of at least one of the following is two bytes: the substitute-bytes input, the substitute-bytes output, the PRG output, the data register input, the data register output, the key register output.

An example provides an apparatus comprising: a first circuitry operable to convert a value on an input of the first circuitry into a value on an output of the first circuitry in accordance with an encryption matrix; a second circuitry operable to provide an inversion of a value on an input of the second circuitry to an output of the second circuitry; a third circuitry operable to provide an inversion of a value on an input of the third circuitry to an output of the third circuitry; and a fourth circuitry operable to perform an XOR of a value on the output of the second circuitry and a value on the output of the third circuitry, wherein the input of the second circuitry is coupled to at least one of: the input of the first circuitry and the output of the first circuitry.

Some embodiments provide an apparatus wherein the input of the third circuitry is coupled to an output of a fifth circuitry.

Some embodiments provide an apparatus comprising: a sixth circuitry having at least a first input coupled to the output of a seventh circuitry, a second input coupled to an XOR of the output of the seventh circuitry and the output of the fifth circuitry, a selection input, and an output coupled to the input of the first circuitry.

Some embodiments provide an apparatus comprising: an eighth circuitry having at least a first input coupled to the output of the sixth circuitry, a second input coupled to an XOR of the output of the fifth circuitry and the output of the sixth circuitry, a selection input, and an output coupled to the input of the first circuitry.

Some embodiments provide an apparatus wherein the input of the second circuitry is coupled to the output of the sixth circuitry.

Some embodiments provide an apparatus wherein a width of at least one of the following is an integer number of bytes: the input of the first circuitry, the output of the first circuitry, the input of the second circuitry, and the input of the third circuitry.

Some embodiments provide an apparatus wherein a width of at least one of the following is two bytes: the input of the first circuitry, the output of the first circuitry, the input of the second circuitry, and the input of the third circuitry.

Some embodiments provide an apparatus comprising: a ninth circuitry operable to provide a sequence of pseudo-random numbers on a first output of the ninth circuitry and a registered copy of the sequence on a second output of the ninth circuitry; a tenth circuitry operable to provide an XOR of a value on the output of the first circuitry and a value on the first output of the ninth circuitry onto an output of the tenth circuitry coupled to an input of a fifth circuitry; and an eleventh circuitry operable to provide an XOR of a value on an output of the fifth circuitry, a value on an output of a seventh circuitry, and a value on the second output of the ninth circuitry onto an output of the eleventh circuitry coupled to the input of the first circuitry.

An example provides a system comprising a memory, a processor coupled to the memory, and a wireless interface for allowing the processor to communicate with another device, the system including the apparatus of various of the examples above.

An example provides a system comprising a memory, a processor coupled to the memory, and a wireless interface for allowing the processor to communicate with another device, the processor including: a first circuitry operable to convert a value on an input of the first circuitry into a value on an output of the first circuitry in accordance with an encryption matrix; a second circuitry operable to provide an inversion of a value on an input of the second circuitry to an output of the second circuitry; a third circuitry operable to provide an inversion of a value on an input of the third circuitry to an output of the third circuitry; and a fourth circuitry operable to perform an XOR of a value on the output of the second circuitry and a value on the output of the third circuitry, wherein the input of the second circuitry is coupled to at least one of: the input of the first circuitry and the output of the first circuitry.

Some embodiments provide a system comprising: wherein the input of the third circuitry is coupled to an output of a fifth circuitry.

Some embodiments provide a system comprising: a sixth circuitry having at least a first input coupled to the output of a seventh circuitry, a second input coupled to an XOR of the output of the seventh circuitry and the output of the fifth circuitry, a selection input, and an output coupled to the input of the first circuitry; an eighth circuitry having at least a first input coupled to the output of the sixth circuitry, a second input coupled to an XOR of the output of the fifth circuitry and the output of the sixth circuitry, a selection input, and an output coupled to the input of the first circuitry; and wherein the input of the second circuitry is coupled to the output of the sixth circuitry.

Some embodiments provide a system comprising: a ninth circuitry operable to provide a sequence of pseudo-random numbers on a first output of the ninth circuitry and a registered copy of the sequence on a second output of the ninth circuitry; a tenth circuitry operable to provide an XOR of a value on the output of the first circuitry and a value on the first output of the ninth circuitry onto an output of the tenth circuitry coupled to an input of a fifth circuitry; and an eleventh circuitry operable to provide an XOR of a value on an output of the fifth circuitry, a value on an output of a seventh circuitry, and a value on the second output of the ninth circuitry onto an output of the eleventh circuitry coupled to the input of the first circuitry.

An example provides a method comprising: converting a substitute-bytes input into a substitute-bytes output in accordance with an Advanced Encryption Standard (AES) Rijndael S-box matrix; inverting a first input to produce a first inverted output; inverting a second input to produce a second inverted output; and performing an XOR of the first inverted output and the second inverted output, wherein the first input is coupled to at least one of: the substitute-bytes input, and the substitute-bytes output.

Some embodiments provide a method wherein the second input is coupled to an output of a data register circuitry.

Some embodiments provide a method wherein a width of at least one of the following is an integer number of bytes: the substitute-bytes input, the substitute-bytes output, the first inverted output, the second inverted output, and the output of the data register circuitry.

Some embodiments provide a method wherein a width of at least one of the following is two bytes: the substitute-bytes input, the substitute-bytes output, the first inverted output, the second inverted output, and the output of the data register circuitry.

Some embodiments provide a method comprising: generating a sequence of pseudo-random numbers on a first pseudo-random number generation (PRG) output and a registered copy of the sequence of pseudo-random numbers on a second PRG output; masking a value on the substitute-bytes output by providing an XOR of a value on the substitute-bytes output and a value on the first PRG output onto a data register input; and unmasking a value on a data register output by providing an XOR of a value on the data register output, a value on a key register output, and a value on the second PRG output onto an interface coupled to the substitute-bytes input.

An example provides a machine readable storage media having machine executable instructions stored thereon that, when executed, cause one or more processors to perform a method according to various of the examples above.

An example provides an apparatus comprising: means for converting a substitute-bytes input into a substitute-bytes output in accordance with an Advanced Encryption Standard (AES) Rijndael S-box matrix; means for inverting a first input to produce a first inverted output; means for inverting a second input to produce a second inverted output; and means for performing an XOR of the first inverted output and the second inverted output, wherein the first input is coupled to at least one of: the substitute-bytes input, and the substitute-bytes output.

Some embodiments provide an apparatus wherein the second input is coupled to an output of a data register circuitry.

Some embodiments provide an apparatus wherein a width of at least one of the following is an integer number of bytes: the substitute-bytes input, the substitute-bytes output, the first inverted output, the second inverted output, and the output of the data register circuitry.

Some embodiments provide an apparatus wherein a width of at least one of the following is two bytes: the substitute-bytes input, the substitute-bytes output, the first inverted output, the second inverted output, and the output of the data register circuitry.

Some embodiments provide an apparatus comprising: means for generating a sequence of pseudo-random numbers on a first pseudo-random number generation (PRG) output and a registered copy of the sequence of pseudo-random numbers on a second PRG output; means for masking a value on the substitute-bytes output by providing an XOR of a value on the substitute-bytes output and a value on the first PRG output onto a data register input; and means for unmasking a value on a data register output by providing an XOR of a value on the data register output, a value on a key register output, and a value on the second PRG output onto an interface coupled to the substitute-bytes input.

An example provides a machine readable storage media having machine executable instructions stored thereon that, when executed, cause one or more processors to perform an operation comprising: convert a substitute-bytes input into a substitute-bytes output in accordance with an Advanced Encryption Standard (AES) Rijndael S-box matrix; invert a first input to produce a first inverted output; invert a second input to produce a second inverted output; and perform an XOR of the first inverted output and the second inverted output, wherein the first input is coupled to at least one of: the substitute-bytes input, and the substitute-bytes output.

Some embodiments provide a machine readable storage media wherein the second input is coupled to an output of a data register circuitry.

Some embodiments provide a machine readable storage media wherein a width of at least one of the following is an integer number of bytes: the substitute-bytes input, the substitute-bytes output, the first inverted output, the second inverted output, and the output of the data register circuitry.

Some embodiments provide a machine readable storage media wherein a width of at least one of the following is two bytes: the substitute-bytes input, the substitute-bytes output, the first inverted output, the second inverted output, and the output of the data register circuitry.

Some embodiments provide a machine readable storage media comprising: generate a sequence of pseudo-random numbers on a first pseudo-random number generation (PRG) output and a registered copy of the sequence of pseudo-random numbers on a second PRG output; mask a value on the substitute-bytes output by providing an XOR of a value on the substitute-bytes output and a value on the first PRG output onto a data register input; and unmask a value on a data register output by providing an XOR of a value on the data register output, a value on a key register output, and a value on the second PRG output onto an interface coupled to the substitute-bytes input.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
   a first circuitry operable to convert a value on an input of the first circuitry into a value on an output of the first circuitry in accordance with an encryption matrix;
   a second circuitry operable to provide a sequence of pseudo-random numbers on a first output of the second circuitry and a registered copy of the sequence on a second output of the second circuitry; and
   a third circuitry operable to provide an XOR of a value on the output of the first circuitry and a value on the first output of the second circuitry onto an output of the third circuitry coupled to an input of a fourth circuitry.

2. The apparatus of claim 1, comprising:
   a fifth circuitry operable to provide an XOR of a value on an output of the fourth circuitry, a value coupled to an output of a sixth circuitry, and a value on the second output of the second circuitry onto an output of the fifth circuitry coupled to the input of the first circuitry.

3. The apparatus of claim 2,
   wherein a width of at least one of the following is an integer number of bytes: the input of the first circuitry, the output of the first circuitry, the first output of the second circuitry, the second output of the second circuitry, the output of the third circuitry, the input of the fourth circuitry, the output of the fourth circuitry, the output of the sixth circuitry, and the output of the fifth circuitry.

4. The apparatus of claim 2,
   wherein a width of at least one of the following is two bytes: the input of the first circuitry, the output of the first circuitry, the first output of the second circuitry, the second output of the second circuitry, the output of the third circuitry, the input of the fourth circuitry, the output of the fourth circuitry, the output of the sixth circuitry, and the output of the fifth circuitry.

5. The apparatus of claim 2, comprising:
   a seventh circuitry operable to convert a value on an input of the seventh circuitry into a value on an output of the seventh circuitry in accordance with a transformation process.

6. The apparatus of claim 5, comprising:
   an eighth circuitry having at least a first input coupled to the output of the fourth circuitry, a second input coupled to the output of the seventh circuitry, a selection input, and an output coupled to the input of the fourth circuitry.

7. The apparatus of claim 5 comprising:
   a ninth circuitry having at least a first input coupled to the output of the first circuitry, a second input coupled to the output of the third circuitry, a selection input, and an output coupled to the input of the seventh circuitry.

8. The apparatus of claim 2 comprising:
   a tenth circuitry having at least a first input coupled to the output of the sixth circuitry, a second input coupled to an XOR of the output of the sixth circuitry and the output of the fourth circuitry, a selection input, and an output coupled to the input of the first circuitry.

9. The apparatus of claim 8, comprising:
   an eleventh circuitry operable to provide an inversion of a value on an input of the eleventh circuitry to an output of the eleventh circuitry, the input of the eleventh circuitry being coupled to the output of the tenth circuitry;
   a twelfth circuitry operable to provide an inversion of a value on an input of the twelfth circuitry to an output of the twelfth circuitry, the input of the twelfth circuitry being coupled to the output of the fourth circuitry; and
   a thirteenth circuitry operable to perform an XOR of a value on the output of the twelfth circuitry and a value on the output of the twelfth circuitry.

10. The apparatus of claim 1,
    wherein the second circuitry comprises a Linear-Feedback Shift Register (LFSR).

11. A system comprising a memory, a processor coupled to the memory, and a wireless interface for allowing the processor to communicate with another device, the system including the apparatus of claim 1.

12. A system comprising a memory, a processor coupled to the memory, and a wireless interface for allowing the processor to communicate with another device, the processor including:
    a first circuitry operable to convert a value on an input of the first circuitry into a value on an output of the first circuitry in accordance with an encryption matrix;

a second circuitry operable to provide a sequence of pseudo-random numbers on a first output of the second circuitry and a registered copy of the sequence on a second output of the second circuitry; and a third circuitry operable to provide an XOR of a value on the output of the first circuitry and a value on the first output of the second circuitry onto an output of the third circuitry coupled to an input of a fourth circuitry.

13. The system of claim 12, comprising:

a fifth circuitry operable to provide an XOR of a value on an output of the fourth circuitry, a value coupled to an output of a sixth circuitry, and a value on the second output of the second circuitry onto an output of the fifth circuitry coupled to the input of the first circuitry;

a seventh circuitry operable to convert a value on an input of the seventh circuitry into a value on an output of the seventh circuitry in accordance with a transformation process, wherein the second circuitry comprises a Linear-Feedback Shift Register (LFSR).

14. The system of claim 13, comprising:

an eighth circuitry having at least a first input coupled to the output of the fourth circuitry, a second input coupled to the output of the seventh circuitry, a selection input, and an output coupled to the input of the fourth circuitry;

a ninth circuitry having at least a first input coupled to the output of the first circuitry, a second input coupled to the output of the third circuitry, a selection input, and an output coupled to the input of the seventh circuitry; and a tenth circuitry having at least a first input coupled to the output of the sixth circuitry, a second input coupled to an XOR of the output of the sixth circuitry and the output of the fourth circuitry, a selection input, and an output coupled to the input of the first circuitry.

15. The system of claim 14, comprising:

an eleventh circuitry operable to provide an inversion of a value on an input of the eleventh circuitry to an output of the eleventh circuitry, the input of the eleventh circuitry being coupled to the output of the tenth circuitry;

a twelfth circuitry operable to provide an inversion of a value on an input of the twelfth circuitry to an output of the twelfth circuitry, the input of the twelfth circuitry being coupled to the output of the fourth circuitry; and a thirteenth circuitry operable to perform an XOR of a value on the output of the twelfth circuitry and a value on the output of the twelfth circuitry.

16. An apparatus comprising:

a first circuitry operable to convert a value on an input of the first circuitry into a value on an output of the first circuitry in accordance with an encryption matrix;

a second circuitry operable to provide an inversion of a value on an input of the second circuitry to an output of the second circuitry;

a third circuitry operable to provide an inversion of a value on an input of the third circuitry to an output of the third circuitry; and a fourth circuitry operable to perform an XOR of a value on the output of the second circuitry and a value on the output of the third circuitry, wherein the input of the second circuitry is coupled to at least one of: the input of the first circuitry and the output of the first circuitry; and wherein the input of the second circuitry is coupled to an output of a key register circuitry.

17. The apparatus of claim 16, wherein the input of the third circuitry is coupled to an output of a fifth circuitry.

18. The apparatus of claim 17, comprising:

a sixth circuitry having at least a first input coupled to an output of a seventh circuitry, a second input coupled to an XOR of the output of the seventh circuitry and the output of the fifth circuitry, a selection input, and an output coupled to the input of the first circuitry.

* * * * *